United States Patent
Ogawa et al.

(10) Patent No.: US 12,241,233 B2
(45) Date of Patent: Mar. 4, 2025

(54) INFORMATION COMMUNICATIONS SYSTEM FOR CONSTRUCTION MACHINE AND MACHINE LEARNING APPARATUS

(71) Applicant: SUMITOMO HEAVY INDUSTRIES, LTD., Tokyo (JP)

(72) Inventors: Masaki Ogawa, Kanagawa (JP); Ayano Shinato, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 57 days.

(21) Appl. No.: 17/934,246

(22) Filed: Sep. 22, 2022

(65) Prior Publication Data

US 2023/0009234 A1 Jan. 12, 2023

Related U.S. Application Data

(63) Continuation of application No. PCT/JP2021/012620, filed on Mar. 25, 2021.

(30) Foreign Application Priority Data

Mar. 26, 2020 (JP) .................. 2020-056745

(51) Int. Cl.
*E02F 9/26* (2006.01)
*B60R 1/26* (2022.01)
*E02F 9/22* (2006.01)

(52) U.S. Cl.
CPC ............... *E02F 9/261* (2013.01); *B60R 1/26* (2022.01); *B60R 2300/50* (2013.01); *E02F 9/2228* (2013.01); *E02F 9/2285* (2013.01); *E02F 9/2292* (2013.01); *E02F 9/2296* (2013.01)

(58) Field of Classification Search
CPC ....... E02F 9/261; E02F 9/2228; E02F 9/2285; E02F 9/2292; E02F 9/2296; B60R 1/26; B60R 2300/50
USPC ........................................ 340/601
See application file for complete search history.

(56) References Cited

U.S. PATENT DOCUMENTS

| | | | |
|---|---|---|---|
| 6,643,582 B2 * | 11/2003 | Adachi ................. | E02F 9/2054 340/988 |
| 7,084,775 B1 * | 8/2006 | Smith ................. | H04L 12/1895 340/905 |
| 2002/0045986 A1 * | 4/2002 | Tamaru ................. | E02F 9/2054 701/482 |

(Continued)

FOREIGN PATENT DOCUMENTS

| | | |
|---|---|---|
| CN | 101893725 | 9/2013 |
| JP | 2001-195418 | 7/2001 |

(Continued)

OTHER PUBLICATIONS

International Search Report for PCT/JP2021/012620 mailed on Jun. 15, 2021.

*Primary Examiner* — Zhen Y Wu
(74) *Attorney, Agent, or Firm* — IPUSA, PLLC

(57) ABSTRACT

An information communications system for a construction machine includes a hardware processor. The hardware process is configured to receive construction information from a contractor-side device and receive weather information from a weather server. The hardware processor is configured to generate advisory information based on the received construction information and the received weather information.

14 Claims, 13 Drawing Sheets

(56) References Cited

U.S. PATENT DOCUMENTS

| | | | |
|---|---|---|---|
| 2002/0165656 A1* | 11/2002 | Adachi | E02F 9/2054 701/93 |
| 2003/0023325 A1* | 1/2003 | Adachi | G05B 23/027 700/9 |
| 2010/0142759 A1* | 6/2010 | Ridley | E02F 9/2808 382/107 |
| 2012/0303458 A1* | 11/2012 | Schuler, Jr. | G06Q 30/0266 705/14.62 |
| 2013/0261885 A1* | 10/2013 | Hargrave, Jr. | E02F 9/262 345/633 |
| 2014/0213302 A1* | 7/2014 | Yang | G06F 16/9537 455/456.3 |
| 2015/0376869 A1* | 12/2015 | Jackson | E02F 9/2054 701/2 |
| 2017/0037586 A1* | 2/2017 | Kroll et al. | E02F 9/024 |
| 2017/0045623 A1* | 2/2017 | Zlogar | G01S 3/14 |
| 2018/0218304 A1 | 8/2018 | Shike | |
| 2018/0371723 A1* | 12/2018 | Nishi | G05D 1/0094 |
| 2019/0113936 A1* | 4/2019 | Anderson | G05D 1/0027 |
| 2019/0114847 A1* | 4/2019 | Wagner | G05D 1/0038 |
| 2020/0032488 A1* | 1/2020 | Kean | E02F 9/262 |
| 2020/0115882 A1* | 4/2020 | Sano | E02F 9/2267 |
| 2020/0150650 A1* | 5/2020 | Jarlengrip | G05D 1/0055 |
| 2020/0190775 A1* | 6/2020 | Selvaraj | E02F 9/261 |
| 2020/0399863 A1 | 12/2020 | Aizawa et al. | |
| 2021/0002862 A1 | 1/2021 | Ono | |
| 2021/0116601 A1* | 4/2021 | Sherlock | G01W 1/02 |
| 2022/0035073 A1* | 2/2022 | Mehtab | G01W 1/10 |
| 2022/0136217 A1* | 5/2022 | Petrany | G06T 7/174 701/29.4 |

FOREIGN PATENT DOCUMENTS

| | | |
|---|---|---|
| JP | 2002-121775 | 4/2002 |
| JP | 2003-242202 | 8/2003 |
| JP | 2006-197140 | 7/2006 |
| JP | 2006-328733 | 12/2006 |
| JP | 2016-118852 | 6/2016 |
| JP | 2016-184197 | 10/2016 |
| JP | 2017-071916 | 4/2017 |
| JP | 6369885 | 8/2018 |
| JP | 2019-169016 | 10/2019 |
| JP | 2019-200625 | 11/2019 |
| WO | 2019/172424 | 9/2019 |
| WO | 2019/182042 | 9/2019 |

* cited by examiner

| WORKSITE | WORK PERIOD | WORK CONTENT |
|---|---|---|
| △ TOWN, × CITY, ○ PREFECTURE | 2/12–2/19 | EXCAVATION |
| ⋮ | ⋮ | ⋮ |

351

INFORMATION COMMUNICATIONS SYSTEM FOR CONSTRUCTION MACHINE AND MACHINE LEARNING APPARATUS

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2021/012620, filed on Mar. 25, 2021 and designating the U.S., which claims priority to Japanese Patent Application No. 2020-056745, filed on Mar. 26, 2020. The entire contents of the foregoing applications are incorporated herein by reference.

BACKGROUND

Technical Field

The present invention relates to information communications systems for construction machines and machine learning apparatuses.

Description of Related Art

As a method of managing safety in construction sites, presenting danger prediction information including specific safety measures against dangers predicted from work contents to a site agent has been known.

SUMMARY

According to an aspect of the present invention, an information communications system for a construction machine includes a hardware processor. The hardware process is configured to receive construction information from a contractor-side device and receive weather information from a weather server. The hardware processor is configured to generate advisory information based on the received construction information and the received weather information.

DETAILED DESCRIPTION

The above-described related-art technique does not take future changes in the weather conditions into account in predicting dangers. Therefore, the accuracy of conventional danger prediction information for future work is low.

Therefore, it is desired to improve the accuracy of information to present to a contractor.

According to an embodiment of the present invention, the accuracy of information to present to a contractor is improved.

Figure 1:
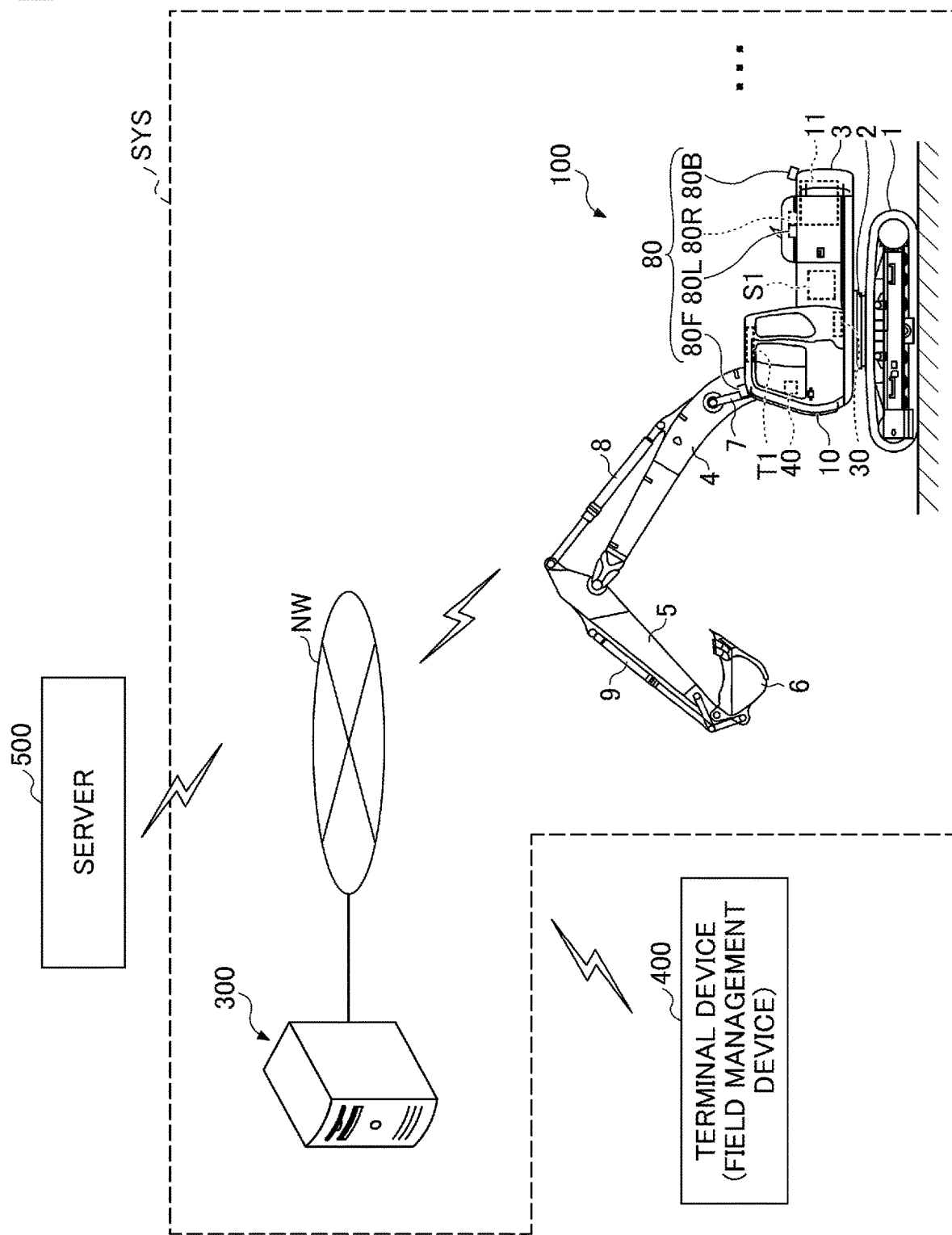
FIG. 1 is a schematic diagram illustrating an example of an information communications system for a construction machine.

Embodiments are described below with reference to the drawings. FIG. 1 is a schematic diagram illustrating an example of an information communications system for a construction machine.

An information communications system SYS for a construction machine according to this embodiment includes a shovel 100 and a management apparatus 300. In the information communications system SYS for a construction machine, the shovel 100 and the management apparatus 300 perform communications via a network, and the management apparatus 300 manages the shovel 100. In the following description, the information communications system SYS for a construction machine is referred to as the information communications system SYS.

Furthermore, the management apparatus 300 according to this embodiment communicates with a terminal device 400, a server 500, etc., via a network.

The shovel 100 according to this embodiment is an example of a construction machine. The shovel 100 may be managed by a contractor that performs work using a construction machine.

The shovel 100 includes a lower traveling structure 1; an upper swing structure 3 swingably mounted on the lower traveling structure 1 via a swing mechanism 2; a boom 4, an arm 5 and a bucket 6 serving as an attachment (working arrangement); and a cabin 10.

The lower traveling structure 1 includes, for example, a pair of right and left crawlers. The lower traveling structure 1 is self-propelled, traveling with the crawlers hydraulically driven by travel hydraulic motors 1A and 1B (see FIG. 2), respectively.

The upper swing structure 3 is driven by a swing hydraulic motor 2A (see FIG. 2) to swing relative to the lower traveling structure 1.

The boom 4 is pivotally attached to the front center of the upper swing structure 3 to be able to rise and lower. The aim 5 is pivotally attached to the distal end of the boom 4 to be able to pivot upward and downward. The bucket 6 is pivotally attached to the distal end of the arm 5 to be able to pivot upward and downward. The boom 4, the aim 5, and the bucket 6 are hydraulically driven by a boom cylinder 7, an arm cylinder 8, and a bucket cylinder 9, respectively.

The cabin 10 is an operation compartment in which an operator (a worker) rides, and is mounted on the front left of the upper swing structure 3.

The shovel 100 can mutually communicate with the management apparatus 300 through a predetermined communications network NW that includes, for example, a mobile communications network including a base station as a terminal end, a satellite communications network using a communications satellite in the sky, the Internet, etc.

Furthermore, the management apparatus 300 according to this embodiment obtains record information indicating work records from the shovel 100.

The record information includes information on the records of work patterns of predetermined types of work (for example, repetitive work including excavation work, loading work, finishing work, etc.) (hereinafter "work pattern record information") and information on the records of environmental conditions during work (hereinafter "environmental condition record information").

A work pattern indicates the pattern of a series of motions of the shovel 100 at the time of performing a predetermined type of work. For example, a work pattern includes the motion trajectories of motion elements such as the lower traveling structure 1, the upper swing structure 3, the boom 4, the arm 5, and the bucket 6 during work. Furthermore, the work pattern record information is specifically the detection information of various kinds of sensors that represents the record of a work pattern of the shovel 100 when the shovel 100 actually performs a predetermined type of work, etc. Furthermore, in addition to external environmental conditions such as conditions related to the surrounding environment of the shovel 100, environmental conditions include internal environmental conditions such as the variable specifications (for example, arm length, bucket type, etc.) of the shovel 100 that affect the motion of the shovel 100.

In response to obtaining the work pattern record information and the environmental condition record information, the shovel 100 transmits (uploads) various kinds of information including the work pattern record information and the environmental condition record information to the management apparatus 300.

In the information communications system SYS, the management apparatus 300 receives construction information including the work pattern record information and the environmental condition record information received from the shovel 100. Furthermore, the management apparatus 300 transmits part of the construction information to the server 500 and receives weather information that is the result of an analysis using the part of the construction information from the server 500.

Furthermore, the management apparatus 300 creates advisory information to present to a contractor using the weather information received from the server 500 and the construction information received from the shovel 100, and outputs the advisory information. The output destination of the advisory information may be either the shovel 100 or the terminal device 400.

The advisory information, which is, for example, information including information indicating precautions for work and messages to an area surrounding a worksite, is presented to a contractor.

The terminal device 400 may be, for example, a terminal used by a supervisor who supervises a worksite where the shovel 100 performs work, or the like. In other words, the terminal device 400 is an example of a field management device for a worksite where the shovel 100 performs work.

The server 500 according to this embodiment is, for example, a weather server that provides various weather-related services. Various weather-related services include, for example, a service to provide weather information. In other words, the server 500 is an example of a weather server that provides weather information.

In response to receiving position information and image data from the management apparatus 300, the server 500 according to this embodiment predicts (analyzes) changes in weather conditions at a worksite from the look of the sky, the shape of clouds, etc., reflected in these image data and the topography of a location, etc., indicated by the position information. Then, the server 500 transmits weather information showing the result of the prediction to the management apparatus 300. The server 500 may also predict (analyze) changes in weather conditions at a worksite using wide-area weather information or may also predict (analyze) changes in weather conditions at a worksite by combining wide-area weather information and the received image data.

According to this embodiment, changes in weather conditions are thus predicted using image data and position information obtained by the shovel 100. Therefore, it is possible to improve the accuracy of predicting changes in weather conditions at a worksite.

Furthermore, according to this embodiment, because the accuracy of weather information is improved, it is possible to improve the accuracy of advisory information created using this weather information.

The number of shovels 100 included in the information communications system SYS, which is one according to the example of FIG. 1, is not limited to this. Any number of shovels 100 may be included in the information communications system SYS, and all of shovels 100 that can communicate with the management apparatus 300 may be included in the information communications system SYS.

The management apparatus 300 according to this embodiment is a terminal apparatus that is installed at a location geographically distant from the shovel 100. The management apparatus 300 is, for example, a server apparatus that is installed in a management center provided outside a worksite where the shovel 100 performs work, or the like, and is constituted mainly of one or more server computers, etc. In this case, the server apparatus may be either a server owned and operated by a business operator operating the information communications system SYS or by a related business operator related to the business operator or a cloud server.

Figure 2:
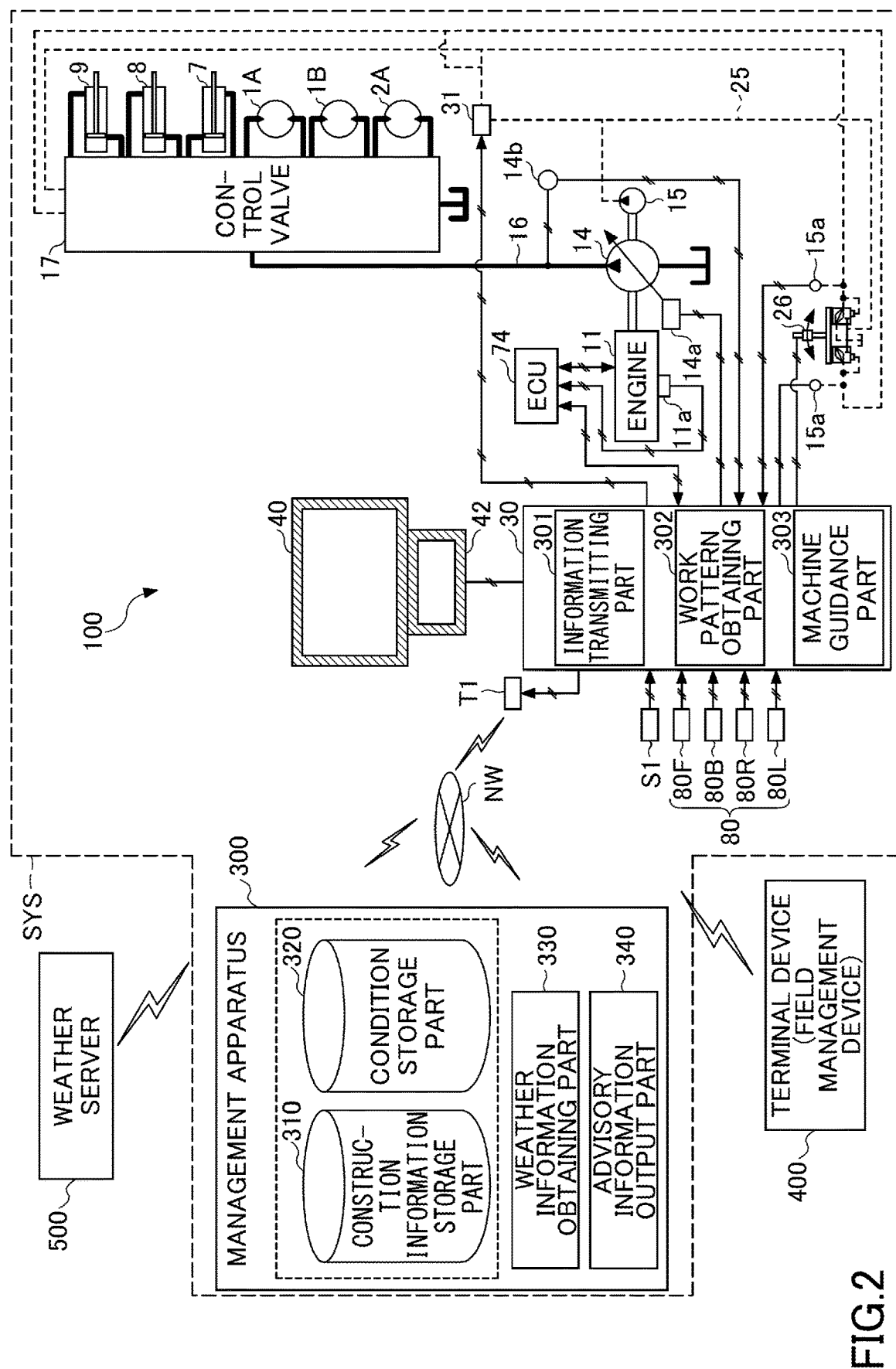
FIG. 2 is a configuration diagram illustrating an example of an information communications system for a shovel according to an embodiment.

Next, the information communications system SYS according to this embodiment is further described with reference to FIG. 2. FIG. 2 is a configuration diagram illustrating an example of an information communications system for a shovel according to the embodiment.

In the drawing, a mechanical power line, a high-pressure hydraulic line, a pilot line, and an electric drive and control line are indicated by a double line, a thick solid line, a dashed line, and a thin solid line, respectively.

A hydraulic drive system that hydraulically drives the hydraulic actuators of the shovel 100 according to this embodiment includes an engine 11, a main pump 14, a regulator 14a, and a control valve 17. Furthermore, the hydraulic drive system of the shovel 100 includes hydraulic actuators such as the travel hydraulic motors 1A and 1B, the swing hydraulic motor 2A, the boom cylinder 7, the arm cylinder 8, and the bucket cylinder 9 that hydraulically drive the lower traveling structure 1, the upper swing structure 3, the boom 4, the arm 5, and the bucket 6, respectively, as described above.

The engine 11, which is a main power source in the hydraulic drive system, is mounted on the back of the upper swing structure 3, for example. Specifically, the engine 11 constantly rotates at a preset target rotational speed under the control of an engine control unit (ECU) 74 described below to drive the main pump 14 and a pilot pump 15. The engine 11 is, for example a diesel engine that is fueled with diesel fuel.

The regulator 14a controls the discharge quantity of the main pump 14. For example, the regulator 14a adjusts the angle (tilt angle) of the swash plate of the main pump 14 in response to a control command from a controller 30.

The main pump 14 is, for example, mounted on the back of the upper swing structure 3 the same as the engine 11, and supplies hydraulic oil to the control valve 17 through a high-pressure hydraulic line 16. The main pump 14 is driven by the engine 11 as described above. The main pump 14 is, for example, a variable displacement hydraulic pump, and its discharge flow rate (discharge pressure) may be controlled by the regulator 14a adjusting the tilt angle of the swash plate to adjust the stroke length of a piston under the control of the controller 30 as described above.

The control valve 17 is a hydraulic control device that is mounted in the center of the upper swing structure 3 and controls the hydraulic drive system according to the operator's operation on an operating device 26, for example. As described above, the control valve 17 is connected to the main pump 14 via the high-pressure hydraulic line 16, and selectively supplies hydraulic oil supplied from the main pump 14 to the hydraulic actuators (the travel hydraulic motors 1A and 1B, the swing hydraulic motor 2A, the boom cylinder 7, the aim cylinder 8, and the bucket cylinder 9) in accordance with the operating state of the operating device 26. Specifically, the control valve 17 includes multiple control valves that control the flow rate and the flow direction of hydraulic oil supplied from the main pump 14 to the individual hydraulic actuators. For example, the control valve 17 includes control valves corresponding to the boom 4 (the boom cylinder 7). Furthermore, for example, the control valve 17 includes control valves corresponding to the arm 5 (the arm cylinder 8). Furthermore, for example, the control valve 17 includes a control valve corresponding to the bucket 6 (the bucket cylinder 9). Furthermore, for example, the control valve 17 includes a control valve corresponding to the upper swing structure 3 (the swing hydraulic motor 2A). Furthermore, for example, the control valve 17 includes a right travel control valve and a left travel control valve corresponding to the right crawler and the left crawler, respectively, of the lower traveling structure 1.

The operation system of the shovel 100 according to this embodiment includes the pilot pump 15, the operating device 26, and an operation valve 31.

The pilot pump 15 is, for example, mounted on the back of the upper swing structure 3 and supplies a pilot pressure to the operating device 26 and the operation valve 31 via a pilot line 25. The pilot pump 15 is, for example, a fixed displacement hydraulic pump and is driven by the engine 11 as described above.

The operating device 26 is provided near the operator seat of the cabin 10 and serves as an operation inputting part that the operator uses to operate various motion elements (such as the lower traveling structure 1, the upper swing structure 3, the boom 4, the arm 5, and the bucket 6). In other words, the operating device 26 is an operation inputting part that the operator uses to operate hydraulic actuators (namely, the travel hydraulic motors 1A and 1B, the swing hydraulic motor 2A, the boom cylinder 7, the aim cylinder 8, the bucket cylinder 9, etc.) that drive corresponding motion elements. Each of the secondary-side pilot lines of the operating device 26 is connected to the control valve 17. This allows a pilot pressure commensurate with the state of operating the lower traveling structure 1, the upper swing structure 3, the boom 4, the arm 5, the bucket 6, etc., at the operating device 26 to be input to the control valve 17. Therefore, the control valve 17 can drive individual hydraulic actuators according to the operating state at the operating device 26.

The operation valve 31 adjusts the flow area of the pilot line 25 in response to a control command (for example, a control current) from the controller 30. This allows the operation valve 31 to output a pilot pressure corresponding to the control command to a secondary-side pilot line, using a primary-side pilot pressure supplied from the pilot pump 15 as a source pressure. The secondary-side port of the operation valve 31 is connected to the left and the right pilot port of each of the control valves corresponding to the hydraulic actuators in the control valve 17 to apply a pilot pressure commensurate with the control command from the controller 30 to the pilot ports of the control valves. This enables the controller 30 to cause hydraulic oil discharged from the pilot pump 15 to be supplied to a pilot port of a corresponding control valve in the control valve 17 via the operation valve 31 to move a hydraulic actuator even when the operating device 26 is not operated by the operator.

A solenoid relief valve to release an excessive hydraulic pressure generated in a hydraulic actuator to a hydraulic oil tank may be provided in addition to the operation valve 31. This makes it possible to actively control the movement of a hydraulic actuator when the amount of the operator's operation on the operating device 26 is excessive. For example, solenoid relief valves that release the respective excessive pressures of the bottom-side oil chambers and the rod-side oil chambers of the boom cylinder 7, the aim cylinder 8, and the bucket cylinder 9 to the hydraulic oil tank may be provided.

The control system of the shovel 100 according to this embodiment includes the controller 30, the ECU 74, a discharge pressure sensor 14b, an operating pressure sensor 15a, a display device 40, an input device 42, a space recognition device 80, a state detector S1, and a communications device T1.

The controller 30 controls the driving of the shovel 100. The functions of the controller 30 may be implemented by desired hardware, software, or a combination thereof. For example, the controller 30 is constituted mainly of a computer including a processor such as a CPU (Central Processing Unit), a memory unit such as a RAM (Random Access Memory), a nonvolatile secondary storage such as a ROM (Read Only Memory), and an interface unit for various inputs and outputs. The controller 30 implements various functions by running various programs installed in the secondary storage on the CPU, for example.

For example, the controller 30 performs driving control to rotate the engine 11 at a constant speed via the ECU 74 by setting a target rotational speed based on a work mode preset by a predetermined operation by the operator or the like and outputting a control command to the ECU 74.

Furthermore, for example, the controller 30 performs so-called full power control and negative control by outputting a control command to the regulator 14a to change the discharge quantity of the main pump 14 on an as-needed basis.

Furthermore, for example, the controller 30 may have a function to upload various kinds of information on the shovel 100 to the management apparatus 300 (hereinafter "upload function"). Specifically, the controller 30 may transmit (upload) the work pattern record information and the environmental condition record information during a predetermined type of work of the shovel 100 to the management apparatus 300 through the communications device T1. The controller 30 includes, for example, an information transmitting part 301 as an upload function-related functional part implemented by running one or more programs installed in the secondary storage or the like on the CPU.

Furthermore, for example, the controller 30 performs control related to a machine guidance function to guide the operator in manually operating the shovel 100 through the operating device 26. Furthermore, the controller 30 may perform control related to a machine control function to automatically assist the operator in manually operating the shovel 100 through the operating device 26. The controller 30 includes, for example, a work pattern obtaining part 302 and a machine guidance part 303 as functional parts related to the machine guidance function and the machine control function implemented by running one or more programs installed in the secondary storage or the like on the CPU.

One or more of the functions of the controller 30 may be implemented by another controller (control device). That is, the functions of the controller 30 may be distributed between and implemented by multiple controllers. For example, the above-described machine guidance function and machine control function may be implemented by a dedicated controller (control device).

The ECU 74 controls various actuators (for example, a fuel injector, etc.) of the engine 11 in response to a control command from the controller 30 to constantly rotate the engine 11 at the set target rotational speed (set rotational speed) (constant rotation control). At this point, the ECU 74 performs the constant rotation control of the engine 11 based on the rotational speed of the engine 11 detected by an engine rotational speed sensor 11a.

The discharge pressure sensor 14b detects the discharge pressure of the main pump 14. A detection signal corresponding to the discharge pressure detected by the discharge pressure sensor 14b is fed into the controller 30.

The operating pressure sensor 15a detects the secondary-side pilot pressure of the operating device 26, namely, a pilot pressure corresponding to the state of operation of each motion element (hydraulic actuator) at the operating device 26, as described above. Detection signals of pilot pressures corresponding to the states of operation of the lower traveling structure 1, the upper swing structure 3, the boom 4, the arm 5, the bucket 6, etc., at the operating device 26 detected by the operating pressure sensor 15a are fed into the controller 30.

The display device 40 is connected to the controller 30, and is provided at such a position as to be easily visible by the operator seated in the cabin 10 to display various information images under the control of the controller 30. Examples of the display device 40 include a liquid crystal display and an organic EL (Electroluminescence) display.

The input device 42 is provided within the reach of the operator seated in the cabin 10, and receives the operator's various operations to output signals corresponding to the details of the operations. For example, the input device 42 is integrated with the display device 40. Alternatively, the input device 42 may be provided separately from the display device 40. The input device 42 includes a touchscreen provided on the display of the display device 40, a knob switch provided at the top of a lever included in the operating device 26, and a button switch, a lever, a toggle, etc., provided around the display device 40. A signal corresponding to the details of an operation on the input device 42 is fed into the controller 30.

The display part of an assist device such as a portable terminal may be used as the display device 40. The assist device is typically a portable terminal device, and is, for example, a notebook PC, a tablet PC, a smartphone or the like carried by a worker or the like at a construction site. Furthermore, the assist device may also be the terminal device 400 according to this embodiment. The assist device may also be a computer carried by the operator of the shovel 100. The assist device may also be a stationary terminal device.

The space recognition device 80 captures an image of an area surrounding the shovel 100. The space recognition device 80 includes a camera 80F that captures an image of an area in front of the shovel 100, a camera 80L that captures an image of an area to the left of the shovel 100, a camera 80R that captures an image of an area to the right of the shovel 100, and a camera 80B that captures an image of an area behind the shovel 100. The controller 30 generates a left captured image from the output of the left camera, generates a right captured image from the output of the right camera, and generates a back captured image from the output of the back camera. The controller 30 displays each of the generated left captured image, right captured image, and back captured image on the display device 40. Furthermore, the controller 30 may also generate an overhead view image of the shovel 100 as seen from above, using the space recognition device 80 placed at the left, the right, and the back, and display the generated overhead view image on the display device 40.

The camera 80F is attached to, for example, the ceiling of the cabin 10, namely, the inside of the cabin 10. Alternatively, the camera 80F may also be attached to the outside of the cabin 10, such as the roof of the cabin 10, the side of the boom 4, or the like. The camera 80L is attached to the left end of the upper surface of the upper swing structure 3. The camera 80R is attached to the right end of the upper surface of the upper swing structure 3. The camera 80B is attached to the back end of the upper surface of the upper swing structure 3.

Each space recognition device 80 (the cameras 80F, 80B, 80L and 80R) is, for example, a monocular wide angle camera having a very wide angle of view. The space recognition device 80 may also be a stereo camera, a distance image camera, or the like. The data of an image of an area surrounding the shovel 100 captured by the space recognition device 80 are fed into the controller 30.

The space recognition device 80 is configured to obtain information on a three-dimensional space around the shovel 100. Furthermore, the space recognition device 80 may also be configured to calculate the distance from the space recognition device 80 or the shovel 100 to an object recognized by the space recognition device 80. The space recognition device 80 is, for example, an ultrasonic sensor, a millimeter wave radar, a monocular camera, a stereo camera, a LIDAR, a distance image sensor, an infrared sensor or the like. According to this embodiment, the space recognition device 80 includes the front camera 80F attached to the front end of the upper surface of the cabin 10, the back camera 80B attached to the back end of the upper surface of the upper swing structure 3, the left camera 80L attached to the left end of the upper surface of the upper swing structure 3, and the right camera 80R attached to the right end of the upper surface of the upper swing structure 3. The front camera 80F is optional.

The space recognition device 80 is, for example, a monocular camera including an imaging device such as a CCD or a CMOS, and outputs a captured image to the display device 40. The space recognition device 80 may not only use a captured image but also may, in the case of using a LIDAR, a millimeter wave radar, an ultrasonic sensor, a laser radar or the like as the space recognition device 80, emit multiple signals (laser beams or the like) to an object and receive their reflected signals to detect the distance and the direction of the object from the reflected signals.

The space recognition device 80 may also be configured to detect an object present in an area surrounding the shovel 100. Examples of objects include a terrain shape (a gradient, a hole or the like), an electrical wire, a utility pole, a person, an animal, a vehicle, a construction machine, a building, a wall, a helmet, a safety vest, workwear, and a predetermined mark on a helmet. The space recognition device 80 may be configured to identify at least one of the type, position, shape, etc., of an object. The space recognition device 80 may be configured to distinguish between a person and an object other than a person.

Furthermore, the space recognition device 80 may also be the space recognition device 80 of a fixed point installation type installed at a fixed point in a worksite, and may also employ the space recognition device 80 disposed at a multicopter or the like.

Furthermore, the space recognition device 80 is so installed as to be able to obtain information above the horizon in order to obtain weather information. Furthermore, in order to make it possible to determine the orientation of an image captured by the space recognition device 80, data obtained by the space recognition device 80 are stored in correlation with information indicating its position and orientation.

In order to obtain weather information, the space recognition device 80 captures an image of the sky at predetermined times and transmits the data of the captured image to the management apparatus 300. The controller 30 may capture an image of the sky and transmit the data of the captured image in response to a command from the management apparatus 300. Furthermore, the controller 30 may transmit the data of the captured image to the management apparatus 300 when a predetermined condition is reached. The predetermined condition is, for example, a condition determined based on the generation and the degree of growth of rain clouds or thunderclouds, a cloud cover, etc.

Furthermore, the predetermined condition may be set based not on detection data from the space recognition device 80 but on the output of a sensor such as a raindrop sensor.

Furthermore, the space recognition device 80 may be independent of the shovel 100. Furthermore, the controller 30 may obtain a captured image of a worksite around the shovel 100 output by the space recognition device 80 via the communications device T1. Specifically, the space recognition device 80 may be attached to a multicopter for aerial photography or a steel tower, a utility pole or the like installed in a worksite to obtain information on the worksite based on a captured image of the worksite as seen from above.

The state detector S1 outputs detection information about various states of the shovel 100. The detection information output from the state detector S1 is fed into the controller 30.

For example, the state detector S1 detects the pose state and the operating state of the attachment. Specifically, the state detector S1 may detect the elevation angles of the boom 4, the arm 5, and the bucket 6 (hereinafter, "boom angle," "arm angle," and "bucket angle," respectively). That is, the state detector S1 may include a boom angle sensor, an arm angle sensor, and a bucket angle sensor that detect the boom angle, the aim angle, and the bucket angle, respectively. Furthermore, the state detector S1 may detect the accelerations, angular accelerations, etc., of the boom 4, the arm 5, and the bucket 6. In this case, the state detector S1 may include, for example, a rotary encoder, an acceleration sensor, a six-axis sensor, an IMU (Inertial Measurement Unit), etc., that are attached to each of the boom 4, the arm 5, and the bucket 6. Furthermore, the state detector S1 may include cylinder sensors that detect the cylinder positions, speeds, accelerations, etc., of the boom cylinder 7, the arm cylinder 8, and the bucket cylinder 9 that drive the boom 4, the arm 5, and the bucket 6, respectively.

Furthermore, for example, the state detector S1 detects the pose state of the machine body, namely, the lower traveling structure 1 and the upper swing structure 3. Specifically, the state detector S1 may detect the state of tilt of the machine body relative to a horizontal plane. In this case, the state detector S1 may include, for example, a tilt sensor that is attached to the upper swing structure 3 to detect the tilt angles of the upper swing structure 3 about two axes in its longitudinal direction and lateral direction (hereinafter "longitudinal tilt angle" and "lateral tilt angle").

Furthermore, for example, the state detector S1 detects the swing state of the upper swing structure 3. Specifically, the state detector S1 detects the swing angular velocity and the swing angle of the upper swing structure 3. In this case, the state detector S1 may include, for example, a gyroscope, a resolver, a rotary encoder or the like that is attached to the upper swing structure 3. That is, the state detector S1 may include a swing angle sensor that detects the swing angle, etc., of the upper swing structure 3.

Furthermore, for example, the state detector S1 detects the state of application of a force applied to the shovel 100 through the attachment. Specifically, the state detector S1 may detect the working pressure (cylinder pressure) of a hydraulic actuator. In this case, the state detector S1 may include pressure sensors that detect the pressures of the rod-side oil chamber and the bottom-side oil chamber of each of the boom cylinder 7, the arm cylinder 8, and the bucket cylinder 9.

Furthermore, for example, the state detector S1 may include a sensor that detects the displacement of the spool of a control valve in the control valve 17. Specifically, the state detector S1 may include a boom spool displacement sensor that detects the displacement of a boom spool. Furthermore, the state detector S1 may include an arm spool displacement sensor that detects the displacement of an arm spool. Furthermore, the state detector S1 may include a bucket spool displacement sensor that detects the displacement of a bucket spool. Furthermore, the state detector S1 may include a swing spool displacement sensor that detects the displacement of a swing spool. Furthermore, the state detector S1 may include a right travel spool displacement sensor and a left travel spool displacement sensor that detect the displacements of a right travel spool and a left travel spool that are constituents of a right travel control valve and a left travel control valve, respectively.

Furthermore, for example, the state detector S1 detects the position of the shovel 100, the orientation of the upper swing structure 3, etc. In this case, the state detector S1 may include, for example, a GNSS (Global Navigation Satellite System) compass, a GNSS sensor, or a direction sensor or the like attached to the upper swing structure 3.

The communications device T1 communicates with an external apparatus through the communications network NW. The communications device T1 is, for example, a mobile communications module compliant with a mobile communication standard such as LTE (Long Term Evolution), 4G (4th Generation) or 5G (5th Generation), a satellite communications module for connecting to a satellite communications network, or the like.

The information transmitting part 301 transmits the work pattern record information and the environmental condition record information during a predetermined type of work of the shovel 100 to the management apparatus 300 through the communications device T1. The work pattern record information transmitted by the information transmitting part 301 includes, for example, various kinds of detection information input from the state detector S1.

That is, the management apparatus 300 according to this embodiment receives construction information including the work pattern record information and the environmental condition record information from the shovel 100. The construction information may include machine body identification information for identifying the shovel 100. Accordingly, the construction information may be information in which the machine body identification information of the shovel 100 is correlated with the corresponding work pattern record information and environmental condition record information.

In other words, the management apparatus 300 receives, from the shovel 100, construction information including the position information of the shovel 100 and information showing the content of work of the shovel 100 shown by the work pattern record information obtained by the state detector S1.

Furthermore, the environmental condition record information transmitted by the information transmitting part 301 includes, for example, an image of an area surrounding the shovel 100 input from the space recognition device 80. Furthermore, the environmental condition record information transmitted by the information transmitting part 301 may include information on internal environmental conditions of the shovel 100, for example, variable specifications such as a large-capacity bucket, a long aim, and quick coupling.

The information transmitting part 301, for example, sequentially determines whether a target type of work specified in advance is being performed, and, in response to determining that a target type of work is being performed, links the work pattern record information (namely, various kinds of detection information input from the state detector S1) and the environmental condition record information (namely, an image of an area surrounding the shovel 100 input from the space recognition device 80) during the period of the work and records them in an internal memory or the like.

At this point, date and time information regarding the start and the end of the target type of work and the position information of the shovel 100 during the work may also be stored in the internal memory in such a manner as to be additionally linked to the set of work pattern record information and environmental condition record information.

That is, the construction information according to this embodiment includes the data of an image of an area surrounding the shovel 100 captured by the space recognition device 80 and position information showing the position of the shovel 100. In other words, the data of an image of an area surrounding the shovel 100 and position information showing the position of the shovel 100 are part of construction information that the management apparatus 300 receives from the shovel 100.

At this point, the date and time information may be obtained from a predetermined timekeeping part (for example, an RTC (Real Time Clock)) in the controller 30. The information transmitting part 301 transmits the recorded set of work pattern record information and environmental condition record information to the management apparatus 300 through the communications device T1 at a predetermined time such as when the shovel 100 is in a key-off state (stopped). Furthermore, each time the target type of work is performed, the information transmitting part 301 may transmit the recorded set of work pattern record information and environmental condition record information to the management apparatus 300 through the communications device T1 after the end of the target type of work.

The environmental condition record information may include detection information detected by another sensor mounted on the shovel 100 instead of or in addition to the space recognition device 80. For example, other sensors such as a millimeter wave radar and a LIDAR (Light Detecting and Ranging) may be mounted on the shovel 100, and the environmental condition record information may include the detection information of these sensors.

Hereinafter, the same applies to current environmental condition information to be described below. Furthermore, the environmental condition record information may include weather information. The weather information may include, for example, the detection information of a raindrop sensing sensor, an illuminance sensor, etc., that may be included in the state detector S1. Furthermore, the information transmitting part 301 may transmit only the work pattern record information to the management apparatus 300.

Furthermore, the information transmitting part 301 may sequentially upload the detection information of the state detector S1 and an image of an area surrounding the shovel 100 captured by the space recognition device 80 to the management apparatus 300 through the communications device T1. In this case, the management apparatus 300 may extract information during the target type of work from the information uploaded from the shovel 100 and generate the work pattern record information and the environmental condition record information.

The work pattern obtaining part 302 obtains a work pattern that is optimum for current environmental conditions regarding a predetermined target index (an optimum work pattern) from the management apparatus 300 in the case of performing a predetermined type of work. For example, the work pattern obtaining part 302 transmits a signal that requests to obtain a work pattern (an obtaining request signal), including information on the current environmental conditions of the shovel 100 (hereinafter "current environmental condition information"), to the management apparatus 300 through the communications device T1, in response to the operator's predetermined operation on the input device 42 (hereinafter "obtaining requesting operation").

This enables the management apparatus 300 to provide the shovel 100 with an optimum work pattern that matches the current environmental conditions of the shovel 100. The current environmental condition information includes, for example, the latest image of an area surrounding the shovel 100 captured by the space recognition device 80.

Furthermore, the current environmental condition information may include information on the internal environmental conditions of the shovel 100, for example, variable specifications such as a large-capacity bucket, a long arm, and quick coupling.

Furthermore, the current environmental condition information may include the detection information of a raindrop sensing sensor, an illuminance sensor, etc., that may be included in the state detector S1, namely, weather information. The work pattern obtaining part 302 obtains information on a work pattern transmitted from the management apparatus 300 in response to the obtaining requesting signal and received by the communications device T1.

The machine guidance part 303 performs control related to the machine guidance function and the machine control function. That is, the machine guidance part 303 assists the operator in operating various motion elements (the lower traveling structure 1, the upper swing structure 3, and the attachment including the boom 4, the arm 5, and the bucket 6) through the operating device 26.

For example, when the arm 5 is being operated by the operator through the operating device 26, the machine guidance part 303 may automatically move at least one of the boom 4 and the bucket 6 such that the front edge (for example, teeth tips or back surface) of the bucket 6 coincides with a target design plane (hereinafter, simply "design plane") specified in advance. Furthermore, the machine guidance part 303 may also automatically move the arm 5 independent of the operating state of the operating device 26 operating the arm 5. That is, the machine guidance part 303 may cause the attachment to make a movement specified in advance, using the operator's operating the operating device 26 as a trigger.

More specifically, the machine guidance part 303 obtains various kinds of information from the state detector S1, the space recognition device 80, the communications device T1, the input device 42, etc. Furthermore, the machine guidance part 303, for example, calculates the distance between the bucket 6 and the design plane based on the obtained information. The machine guidance part 303 appropriately controls the operation valve 31 according to the calculated distance between the bucket 6 and the design plane, etc., to individually and automatically adjust a pilot pressure applied to a control valve corresponding to a hydraulic actuator, thereby making it possible to automatically move individual hydraulic actuators.

The operation valve 31 includes, for example, a boom proportional valve corresponding to the boom 4 (the boom cylinder 7). Furthermore, the operation valve 31 includes, for example, an arm proportional valve corresponding to the arm 5 (the arm cylinder 8). Furthermore, the operation valve 31 includes, for example, a bucket proportional valve corresponding to the bucket 6 (the bucket cylinder 9).

Furthermore, the operation valve 31 includes, for example, a swing proportional valve corresponding to the upper swing structure 3 (the swing hydraulic motor 2A). Furthermore, the operation valve 31 includes, for example, a right travel proportional valve and a left travel proportional valve that correspond to the right crawler and the left crawler, respectively, of the lower traveling structure 1.

For example, in order to assist in excavating work, the machine guidance part 303 may automatically extend or retract at least one of the boom cylinder 7, the arm cylinder 8, and the bucket cylinder 9 in response to an operation on the operating device 26 to open or close the arm 5. Excavating work is the work of digging the ground with the teeth tips of the bucket 6 along the design plane. For example, when the operator is manually operating the operating device 26 in a direction to close the arm 5 (hereinafter "aim closing operation"), the machine guidance part 303 automatically extends or retracts at least one of the boom cylinder 7 and the bucket cylinder 9.

Furthermore, the machine guidance part 303 may also automatically extend or retract at least one of the boom cylinder 7, the arm cylinder 8, and the bucket cylinder 9 in order to assist in the work of finishing a slope or a horizontal surface, for example. The finishing work includes, for example, pulling the bucket 6 along the design plane while pressing the back surface of the bucket 6 against the ground.

For example, when the operator is manually performing an aim closing operation on the operating device 26, the machine guidance part 303 automatically extends or retracts at least one of the boom cylinder 7 and the bucket cylinder 9. This makes it possible to move the bucket 6 along the design plane, which is a finished slope or horizontal surface, while pressing the back surface of the bucket 6 against an unfinished inclined surface (slope) or horizontal surface with a predetermined pressing force.

Furthermore, the machine guidance part 303 may automatically rotate the swing hydraulic motor 2A to cause the upper swing structure 3 to face the design plane. In this case, the machine guidance part 303 may cause the upper swing structure 3 to face the design plane in response to a predetermined switch included in the input device 42 being operated. Furthermore, the machine guidance part 303 may cause the upper swing structure 3 to face the design plane and start the machine control function in response to the operation of the predetermined switch alone.

Furthermore, for example, during a predetermined type of work (for example, excavating work, loading work, finishing work, or the like), the machine guidance part 303 controls the motion of at least one of the attachment, the upper swing structure 3, and the lower traveling structure 1 to match a work pattern (an optimum work pattern) obtained by the work pattern obtaining part 302 according to the operator's operation on the operating device 26.

This enables the operator to cause the motion of the shovel 100 to match a work pattern optimum for the current environmental conditions of the shovel 100 so output from the management apparatus 300 as to relatively increase the evaluation of a predetermined target index, for example, work speed, independent of proficiency in controlling the shovel 100.

Furthermore, the machine guidance part 303 may also cause the motion of the shovel 100 corresponding to an optimum work pattern to be displayed on the display device 40 to the operator while controlling the motion of the shovel 100 based on the optimum work pattern. For example, while controlling the motion of the shovel 100 based on an optimum work pattern, the machine guidance part 303 causes the video of a simulation result corresponding to the optimum work pattern to be displayed on the display device 40. This enables the operator to perform work while checking the actual work pattern details with the video on the display device 40.

The management apparatus 300 according to this embodiment includes a construction information storage part 310, a condition storage part 320, a weather information obtaining part 330, and an advisory information output part 340.

The construction information storage part 310 stores construction information received from the shovel 100. The condition storage part 320 according to this embodiment stores condition information that is referred to when the advisory information output part 340 obtains advisory information.

The weather information obtaining part 330 according to this embodiment obtains weather information from the server 500. More specifically, the weather information obtaining part 330 transmits part of construction information received from the shovel 100 to the server 500 and obtains weather information derived using the part of the construction information. The details of processing of the weather information obtaining part 330 are described below. The weather information according to this embodiment includes weather information obtained in the past and weather forecast information that predicts weather conditions.

The advisory information output part 340 obtains advisory information based on construction information and weather information, and outputs the advisory information to the display device 40 of the shovel 100, the terminal device 400, etc. The advisory information output part 340 is described in detail below.

Figure 3:
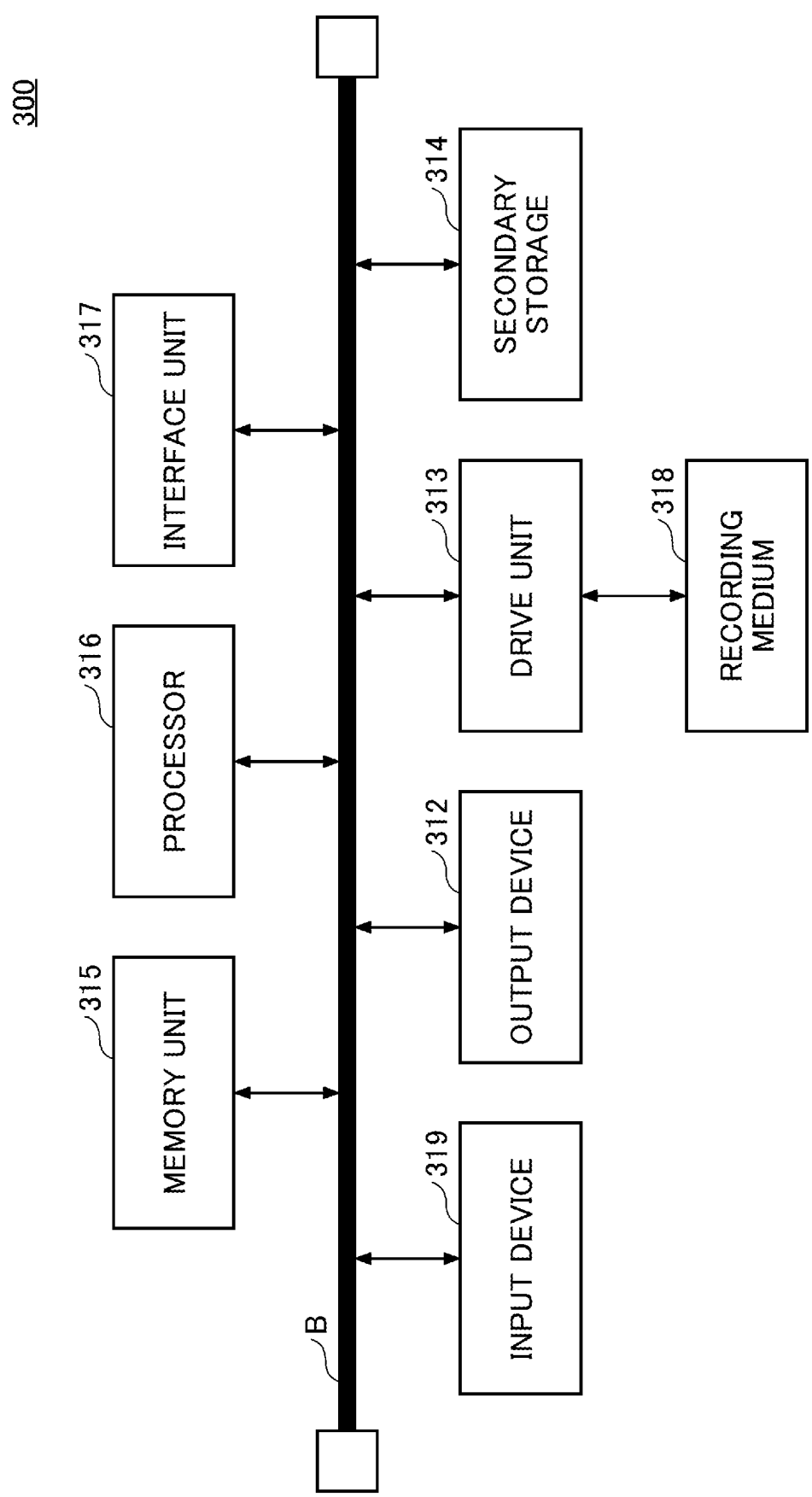
FIG. 3 is a diagram illustrating an example of the hardware configuration of a management apparatus according to the embodiment.

The management apparatus 300 according to this embodiment is described below. FIG. 3 is a diagram illustrating an example of the hardware configuration of a management apparatus according to this embodiment.

The management apparatus 300 according to this embodiment is a computer that includes an input device 319, an output device 312, a drive unit 313, a secondary storage 314, a memory unit 315, a processor 316, and an interface unit 317, which are interconnected by a bus B.

The input device 319, which is a device for inputting various kinds of information, is implemented by, for example, a keyboard, a pointing device, or the like. The output device 312, which is for outputting various kinds of information, is implemented by, for example, a display or the like. The interface unit 317, which includes a LAN card, etc., is used for connecting to a network.

A weather information obtaining program that implements the weather information obtaining part 330 and an advisory information output program that implements the advisory information output part 340 are at least some of various programs that control the management apparatus 300. The weather information obtaining program and the advisory information output program are provided through the distribution of a storage medium 318 or downloading from a network, for example. For the storage medium 318 in which the weather information obtaining program and the advisory information output program are recorded, various types of storage media including storage media in which information is optically, electrically, or magnetically recorded, such as CD-ROMs, flexible disks, and magneto-optical disks, and semiconductor memories in which information is electrically recorded, such as ROMs and flash memories, may be used.

Furthermore, once the storage medium 318 in which the weather information obtaining program and the advisory information output program are recorded is loaded into the drive unit 313, these programs are installed in the secondary storage 314 from the storage medium 318 via the drive unit 313. These programs downloaded from a network are installed in the secondary storage 314 via the interface unit 317.

The secondary storage 314, which implements storage parts, etc., of the management apparatus 300, stores the weather information obtaining program and the advisory information output program installed on the management apparatus 300 and stores various files, data, etc., necessary for the management apparatus 300. The memory unit 315 reads a communication control program from the secondary storage 314 and stores the communication control program at the start of the management apparatus 300. The processor 316 executes various processes as described below according to the weather information obtaining program and the advisory information output program stored in the memory unit 315.

Figure 4:
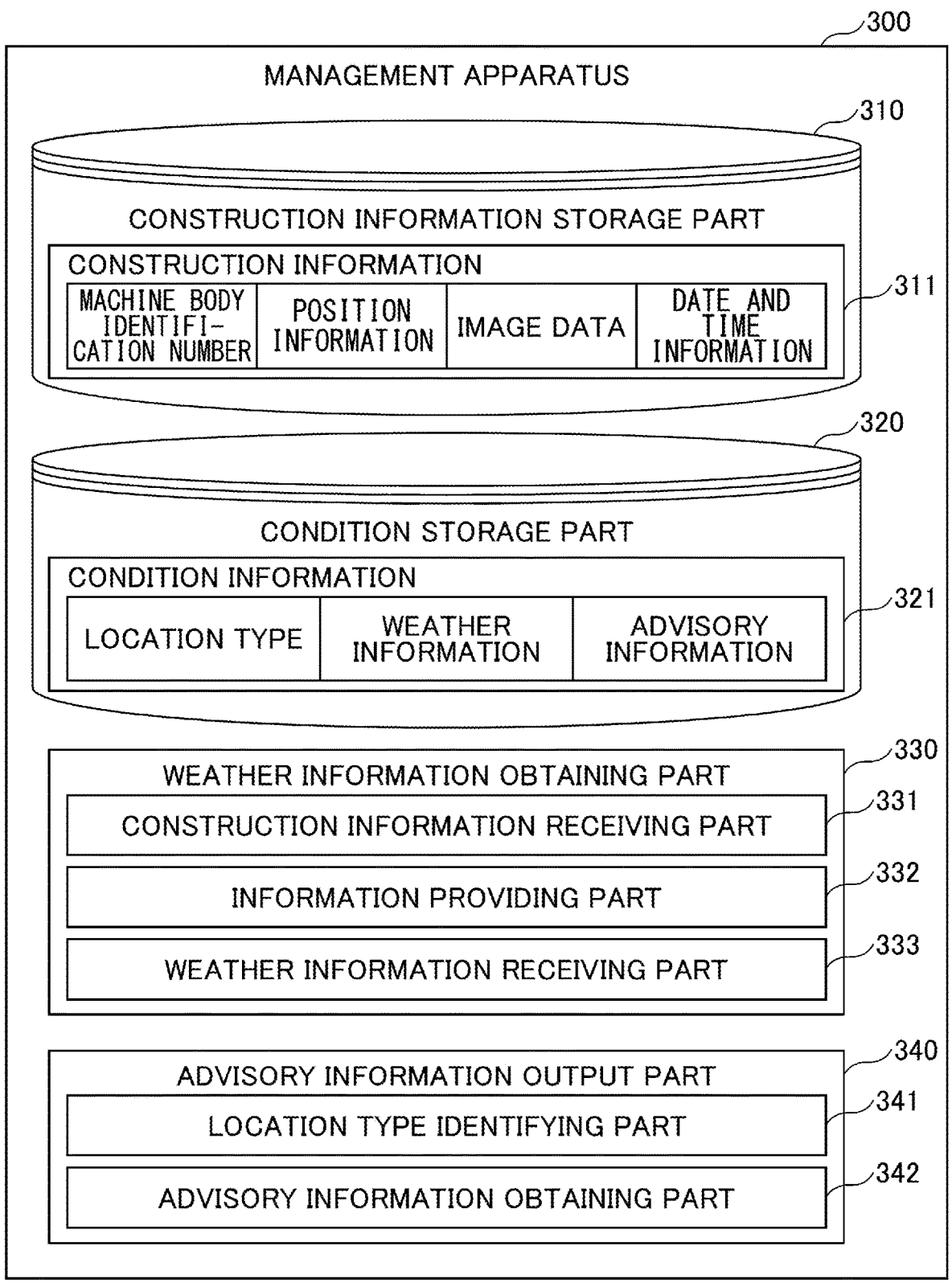
FIG. 4 is a diagram illustrating functions of the management apparatus according to the embodiment.

Next, functions of the management apparatus 300 according to this embodiment are described with reference to FIG. 4. FIG. 4 is a diagram illustrating functions of a management apparatus according to the embodiment.

The construction information storage part 310 according to this embodiment stores construction information 311 received from the shovel 100.

The construction information 311 according to the embodiment is information that includes at least the machine body identification number of the shovel 100, the position information of the shovel 100, the data of an image captured by the space recognition device 80, and date and time information as information items. The information items included in the construction information 311 may also be included in the work pattern record information and the environmental condition record information.

The management apparatus 300, which receives the construction information 311 from the shovel 100 according to this embodiment, is not limited to this. The management apparatus 300 may receive the construction information 311 from the terminal device (field management device) 400. In this case, the shovel 100 transmits the collected construction information 311 to the terminal device 400. In response to receiving the construction information 311 the shovel 100, the terminal device 400 may transmit this construction information 311 to the management apparatus 300.

That is, it can be said that the construction information 311 according to this embodiment is information provided by a contractor that performs work using a construction machine and is information received from a device managed by the contractor (contractor-side device).

The condition storage part 320 according to this embodiment stores condition information 321 showing conditions that are referred to when advisory information is obtained. The condition information 321 may be created and stored in the condition storage part 320 in advance.

The condition information 321 according to this embodiment includes the type of a location around a worksite where the shovel 100 is working, weather information, and advisory information as information items, which are correlated.

According to the condition information 321, the location type is, for example, a residential area, a mountainous area, a riverbed or the like. The location type may be specified from map information or the like provided via the Internet or the like and the position information of the shovel 100.

The weather information, which is, for example, information resulting from an analysis conducted using the position information of the shovel 100 and the data of an image of an area surrounding the shovel 100 in the server 500, includes past weather information and weather information. The weather information is, for example, information showing the result of predicting changes in weather conditions at an area indicated by the position information of the shovel 100.

Furthermore, the weather information may also be the result of predicting changes in weather conditions at a worksite different from the worksite of the shovel 100 that has transmitted the position information.

The advisory information is specifically text data output as advisory information. The advisory information, however, which is described below as text data according to this embodiment, is not limited to this. The advisory information may be shown as an image (a video or a still image) such as an animation, for example.

According to the management apparatus 300 of this embodiment, the weather information obtaining part 330 includes a construction information receiving part 331, an information providing part 332, and a weather information receiving part 333.

The construction information receiving part 331 receives the construction information 311 from the shovel 100 and stores the construction information 311 in the construction information storage part 310. The construction information 311 may be transmitted each time the shovel 100 performs work or may be periodically transmitted, for example.

In response to receiving the construction information 311, the information providing part 332 transmits position information indicating the position of the shovel 100 and the data of an image captured by the space recognition device 80 included in the construction information 311 to the server 500. The image data transmitted to the server 500 here may be either video data or the image data of a still image.

Furthermore, for example, in response to each reception of the construction information 311 from the shovel 100, the information providing part 332 according to this embodiment may extract the position information and the image data included in the construction information 311 and transmit the position information and the image data to the server 500.

Furthermore, the information providing part 332, which transmits the position information and the image data to the server 500 according to this embodiment, is not limited to this. The information providing part 332 provides the server 500 with information that the server 500 requires for an analysis to obtain weather information. Accordingly, the information providing part 332 may transmit information required by the server 500 for the analysis to the server 500 and may transmit information other than the position information and the image data to the server 500.

The weather information receiving part 333 according to this embodiment receives weather information transmitted from the server 500. The weather information receiving part 333 according to this embodiment may output the received weather information, along with advisory information, to the shovel 100, the terminal device 400, etc.

The advisory information output part 340 according to this embodiment includes a location type identifying part 341 and an advisory information obtaining part 342.

The location type identifying part 341 according to this embodiment identifies the type of a location around a worksite at which the shovel 100 is working from the position information included in the construction information 311.

Specifically, for example, the location type identifying part 341 may receive the position information of the shovel 100 at its start and identify a location around a worksite at the start of the shovel 100 based on this position information. According to this embodiment, by identifying the location type based on the position information of the shovel 100 at its start, it is possible to present advisory information according to a worksite where the shovel 100 is going to work.

The advisory information obtaining part 342 obtains advisory information, referring to the location type identified by the location type identifying part 341, the weather information received by the weather information receiving part 333, and the condition information 321.

The text data output as advisory information may be retained in correlation with various conditions shown by the condition information 321 in the advisory information obtaining part 342. Furthermore, the text data output as advisory information may be generated each time according to various conditions shown by the condition information 321.

When the advisory information is generated, the advisory information output part 340 causes the display device 40 of the shovel 100 to display the advisory information. The advisory information output part 340 may cause the advisory information to be displayed on the terminal device 400.

Figure 5:
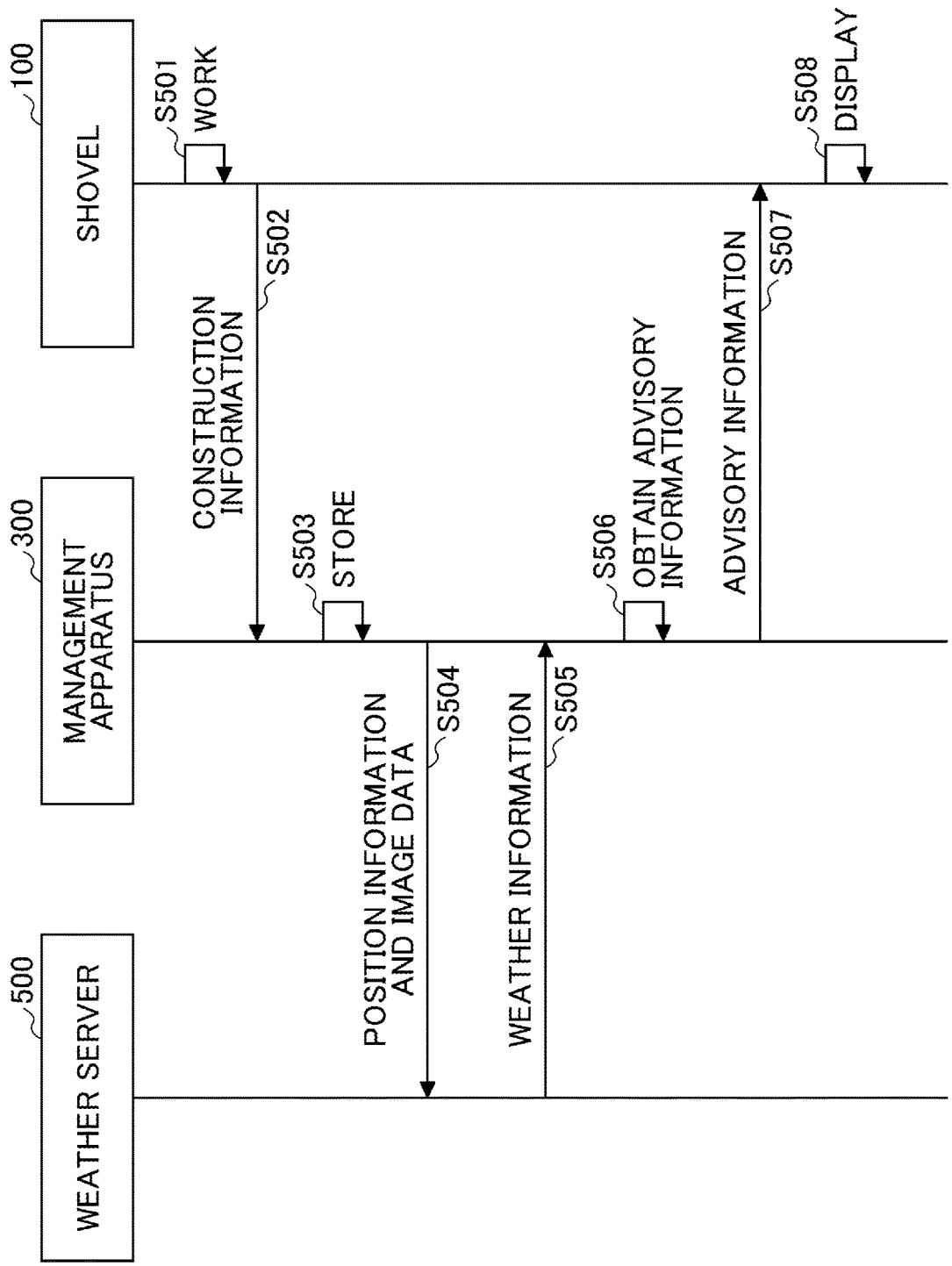
FIG. 5 is a sequence diagram illustrating an operation of the information communications system.

Next, an operation of the information communications system SYS according to this embodiment is described with reference to FIG. 5. FIG. 5 is a sequence diagram illustrating an operation of an information communications system.

According to the information communications system SYS, the shovel 100 gathers the construction information 311 during work (step S501) and transmits the construction information 311 to the management apparatus 300 (step S502).

The shovel 100 may transmit the construction information 311 to the management apparatus 300 at the end of work or may transmit the stored construction information 311 to the management apparatus 300 when the shovel 100 is started.

Next, in response to receiving the construction information 311 using the construction information receiving part 331, the management apparatus 300 stores the construction information 311 in the construction information storage part 310 (step S503). Next, the management apparatus 300 uses the information providing part 332 to transmit position information and image data, which are part of the construction information 311, to the server 500 (step S504).

Next, the management apparatus 300 uses the weather information receiving part 333 to receive weather information obtained from an analysis using the position information and the image data and past weather information from the server 500 (step S505). When current and past weather information has already been obtained in the management apparatus 300, there is no need to transmit the position information and the image data to the server 500.

Next, the management apparatus 300 uses the advisory information output part 340 to obtain advisory information based on the construction information 311 and the weather information (step S506) and transmit the generated advisory information to the shovel 100 (step S507). The process of step S506 is described in detail below.

Thus, the management apparatus 300 generates advisory information (warning information) by combining the weather information and the construction information. For example, the management apparatus 300 extracts a construction site where work is being performed on a slope from the construction information, and generates advisory information against rockfalls, landslides or the like when heavy precipitation is expected around the construction side from the weather forecast information. Furthermore, for example, the management apparatus 300 extracts a construction side where backfilling was performed a day before from the construction information, and calculates a past rainfall from the past weather information to generate advisory information against the formation of soft ground. Furthermore, for example, when the occurrence of a gust is predicted from the weather forecast information, the management apparatus 300 extracts a construction site where a gust is predicted to occur and generates advisory information against the occurrence of a gust.

In response to receiving the advisory information, the shovel 100 causes the advisory information to be displayed on the display device 40 (step S508).

Figure 6:
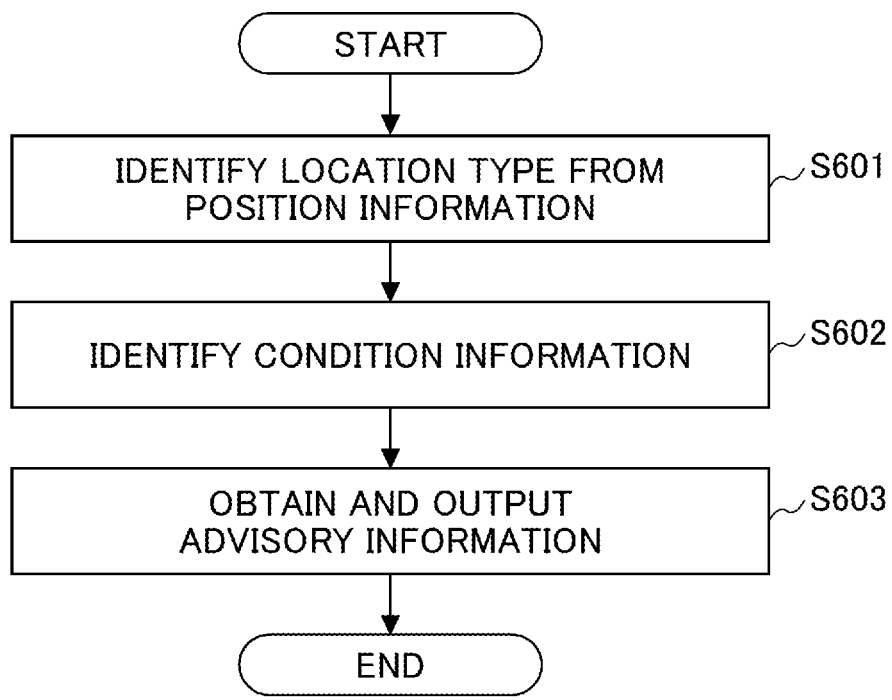
FIG. 6 is a flowchart illustrating processing of an advisory information output part according to the embodiment.

Processing of the advisory information output part 340 is described below with reference to FIG. 6. FIG. 6 is a flowchart illustrating processing of an advisory information output part according to the embodiment. FIG. 6 illustrates the process of step S506 of FIG. 5.

The advisory information output part 340 according to this embodiment uses the location type identifying part 341 to obtain the position information of the shovel 100 included in the construction information 311 and identify the type of a location including the position information (step S601). Specifically, the location type identifying part 341 refers to map information or the like provided via the Internet or the like to identify the type of an area including a location indicated by the position information.

Next, the advisory information output part 340 uses the advisory information obtaining part 342 to refer to the condition information 321 to identify condition information that matches the combination of the identified location type and the obtained weather information (weather forecast information, past weather information, and current weather information) (step S602).

Next, the advisory information output part 340 obtains advisory information included in the identified condition information from the condition storage part 320, and outputs the advisory information to the shovel 100 (step S603).

Figure 7:
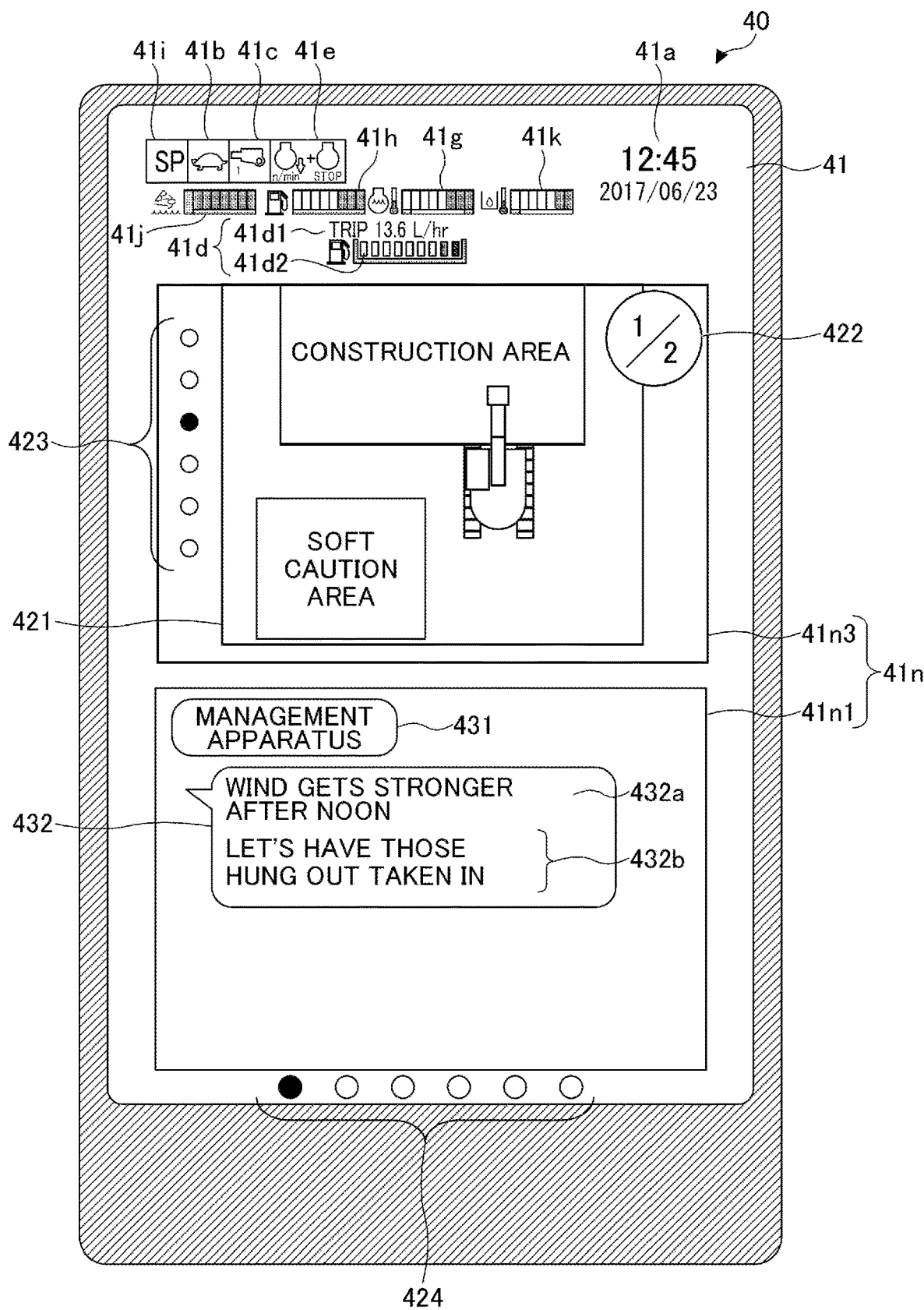
FIG. 7 is a diagram illustrating an example of displaying advisory information according to the embodiment.

An example of displaying advisory information is described below with reference to FIG. 7. FIG. 7 is a diagram illustrating an example of displaying advisory information according to the embodiment. A screen 41 illustrated in FIG. 7 is an example of a screen displayed on the display device 40, showing an example of advisory information being displayed.

The screen 41 includes a date and time display area 41*a*, a travel mode display area 41*b*, an attachment display area 41*c*, a fuel efficiency display area 41*d*, an engine control status display area 41*e*, a coolant water temperature display area 41*g*, a remaining fuel amount display area 41*h*, a rotational speed mode display area 41*i*, a remaining aqueous urea solution amount display area 41*j*, a hydraulic oil temperature display area 41*k*, and an information display area 41*n*.

The date and time display area 41*a* is an area for displaying a current date and time.

The travel mode display area 41*b*, the attachment display area 41*c*, the engine control status display area 41*e*, and the rotational speed mode display area 41*i* are areas for displaying settings information that is information on the settings of the shovel 100.

The fuel efficiency display area 41*d*, the coolant water temperature display area 41*g*, the remaining fuel amount display area 41*h*, the remaining aqueous urea solution amount display area 41*j*, and the hydraulic oil temperature display area 41*k* are areas for displaying operating condition information that is information on the operating condition of the shovel 100.

Specifically, the travel mode display area 41*b* is an area for displaying a current travel mode. The attachment display area 41*c* is an area for displaying an image that represents a currently attached attachment. The fuel efficiency display area 41*d* is an area for displaying fuel efficiency information calculated by the controller 30. The fuel efficiency display area 41*d* includes an average fuel efficiency display area 41*d*1 for displaying a lifelong average fuel efficiency or section average fuel efficiency and an instantaneous fuel efficiency display area 41*d*2 for displaying instantaneous fuel efficiency.

The engine control status display area 41*e* is an area for displaying the control status of the engine 11. The coolant water temperature display area 41*g* is an area for displaying the current temperature condition of engine coolant water. The remaining fuel amount display area 41*h* is an area for displaying the state of the remaining amount of fuel stored in a fuel tank.

The rotational speed mode display area 41*i* is an area for displaying a current rotational speed mode set with an engine rotational speed adjustment dial 75 as an image. The remaining aqueous urea solution amount display area 41*j* is an area for displaying the state of the remaining amount of an aqueous urea solution stored in an aqueous urea solution tank as an image. The hydraulic oil temperature display area 41*k* is an area for displaying the state of the temperature of hydraulic oil in the hydraulic oil tank.

In the screen 41, for example, an image 421 of a map, a construction drawing, or the like is constantly displayed in an image display area 41*n*3. Furthermore, a sheet number display 422 is displayed in the image display area 41*n*3. The sheet number display 422 indicates, for example, that the first of the two received construction drawings is displayed.

Furthermore, by vertically swiping the image 421, it is possible to switch an item displayed as the image 421 to an overhead view image, a back area image, a map, a topographic map, a construction drawing, etc. A vertical order image 423, which indicates what number image from the top an item currently displayed as the image 421 is among all images, is displayed in the image display area 41*n*3. According to this embodiment, the operator can understand that a construction drawing displayed as the image 421 is the third display item from the top.

The image display area 41*n*3 illustrated in FIG. 7 is an example of display when the shovel 100 is not in operation. When the shovel 100 is in operation, an image captured by the back camera 80B or an overhead view image is displayed along with below-described advisory information 432*b* in the image display area 41*n*3. The overhead view image or the back area image displayed during operation is set as the first item from the top displayed as the image 421. Therefore, when the shovel 100 is in operation, an overhead view image or a back area image is displayed as the image 421, and a mark is displayed at the top in the vertical order image 423.

Figure 13:
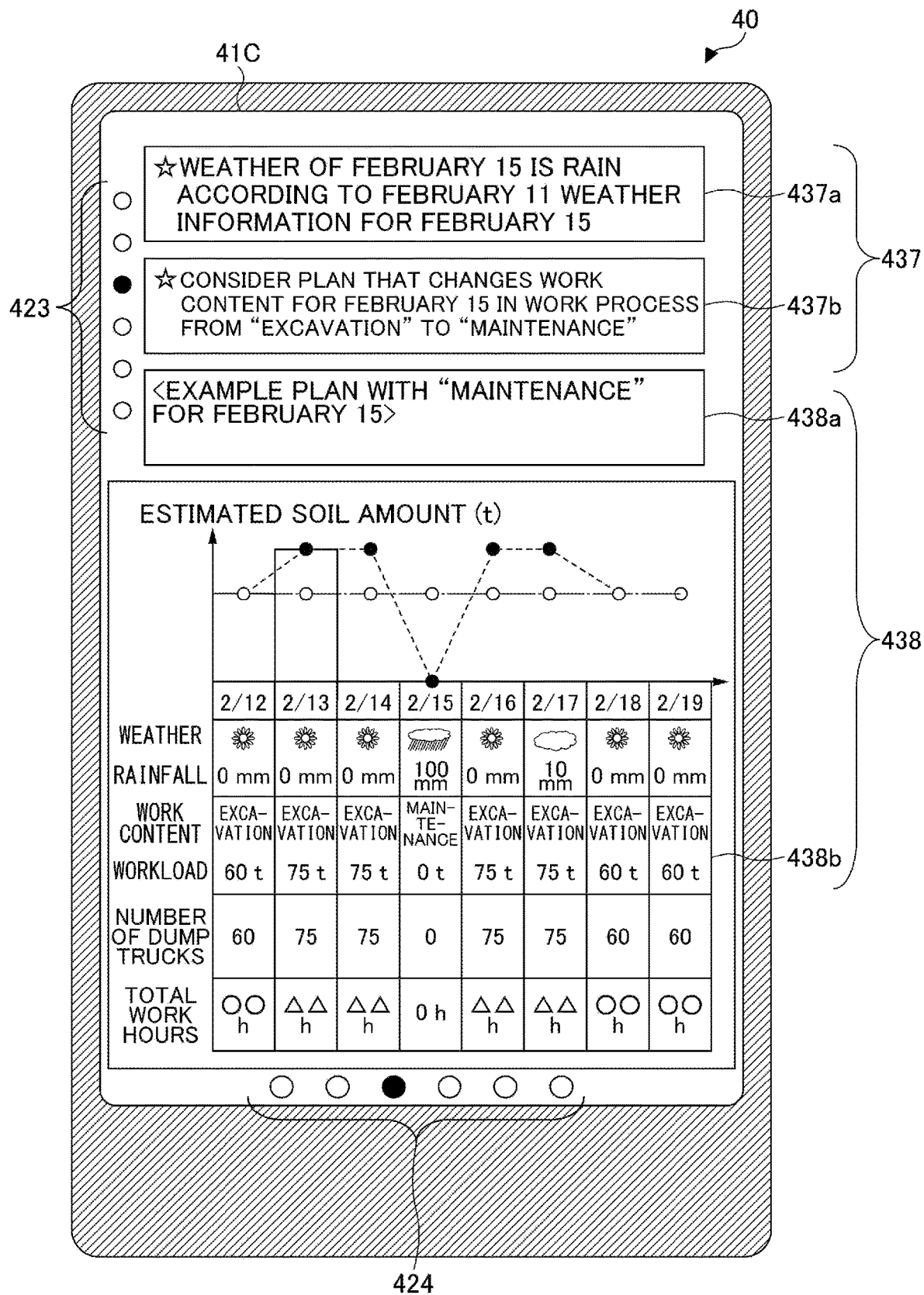
FIG. 13 is a diagram illustrating an example of displaying updated process information.

Furthermore, in the screen 41, a lateral order image 424 with respect to the screen 41 is displayed. According to the example of FIG. 7, when the screen 41 is laterally swiped, the screen 41 may be switched to a process information display screen as illustrated in FIG. 13 as described below, a menu screen, a maintenance screen, an analysis screen, etc.

The lateral order image 424 enables the operator to understand that the screen 41 illustrated in FIG. 7 (and FIG. 11) is set as the first from the left among all images. Furthermore, when a screen 41C illustrated in FIG. 13 is displayed, the operator can understand that the screen 41C is an image set as the third from the left among all images.

In the screen 41, the information display area 41*n* includes a text display area 41*n*1 for displaying text information 431 and 432 and the image display area 41*n*3 for displaying the image 421 of a map, a construction drawing, or the like.

In the text display area 41*n*1, the text information 431 is information indicating that the source of transmission of the text information 432 is the management apparatus 300, and is displayed in correlation with the text information 432.

The text information 432 is information that predicts a future situation to watch out for at a worksite based on current weather information and current construction information. The text information 432 includes weather information 432a obtained by the weather information obtaining part 330 and the advisory information 432b.

The example of FIG. 7 illustrates the case where the type of a location around the worksite of the shovel 100 is a residential area and the wind is predicted to get stronger in the afternoon.

In the text display area 41n1, the text information that WIND GETS STRONGER IN THE AFTERNOON is displayed as the weather information 432a.

Furthermore, in this case, the advisory information obtaining part 342 identifies the condition information 321 whose combination of the location type and the weather information is "residential area" and "strong wind" in the condition information 321 stored in the condition storage part 320, and obtains advisory information corresponding to this combination.

Here, it is assumed that the advisory information corresponding to the combination of "residential area" and "strong wind" is LET'S HAVE THOSE HUNG OUT TAKEN IN.

Accordingly, the text information that LET'S HAVE THOSE HUNG OUT TAKEN IN is displayed as the advisory information 432b in the text display area 41n1.

Furthermore, the image 421 displayed in the image display area 41n3 may also be, for example, what estimates a situation to watch out for at a current worksite based on past weather information and past construction information. Furthermore, the image 421 displayed in the image display area 41n3 may also be, for example, an image indicating the position of soft ground as an estimated caution area at a current worksite. This enables the shovel 100 to avoid entering soft ground where the entry may cause the shovel 100 to be buried in the ground. Furthermore, according to this embodiment, when the shovel 100 travels toward a caution area, the operator may be warned (by display, voice, etc.) or the travel motion of the shovel 100 may be braked (decelerated or stopped).

Furthermore, the image 421 may include an image represented by image data obtained with the space recognition device 80. Furthermore, in this case, an image indicating the position of estimated soft ground may be displayed over the image represented by the image data obtained with the space recognition device 80. Furthermore, the image 421 may include an image showing the topographic map of a worksite.

Furthermore, the image 421 according to this embodiment may include an image of a construction area where the shovel 100 performs construction at a worksite.

Furthermore, according to this embodiment, the positions of past construction areas, current multiple shovels 100, and planned construction areas are correlated in the management apparatus 300. Position information indicating the positions of past construction areas is obtained from the construction information 311 of the past. Furthermore, the position information of planned construction areas may be obtained from construction plan information showing construction plans. Furthermore, it is assumed that the shovel 100 according to this embodiment obtains not only the position information of construction areas but also the content of work using the state detector S1.

Thus, according to this embodiment, the position information of the shovel 100 and the data of an image of an area surrounding the shovel 100 are provided for the server 500, and the server 500 is caused to predict changes in the weather in an area including the worksite of the shovel 100 using the provided information. Thus, according to this embodiment, it is possible to contribute to improvement in the prediction of changes in the weather in an area including the worksite of the shovel 100.

Furthermore, according to this embodiment, advisory information according to the combination of the type of a location including the worksite of the shovel 100 and weather information obtained from the server 500 is presented to a contractor.

Thus, according to this embodiment, it is possible to present advisory information suitable for the environment of a worksite based on the latest weather information to a contractor.

The advisory information, which is assumed to be output to the shovel 100 that has transmitted the construction information 311 to the management apparatus 300 according to each embodiment as described above, is not limited to this. The advisory information may also be transmitted to a shovel 100 other than the shovel 100 that has transmitted the construction information 311 to the management apparatus 300.

In this case, the management apparatus 300 may obtain the weather information of an area including the worksite of the other shovel 100 based on the position information and the image data of the shovel 100 that has transmitted the construction information 311.

For example, it is assumed that the worksite of the shovel 100 is a mountainous area or the like upstream of a river. In this case, the management apparatus 300 may transmit part of the construction information 311 received from the shovel 100 to the server 500 and obtain the weather information of a worksite such as a riverbed downstream of the river. The management apparatus 300 may transmit advisory information based on the weather information of the worksite downstream of the river to another shovel 100 working at the worksite downstream of the river.

In this manner, for example, when there is torrential rain around a worksite upstream of a river, it is possible to transmit appropriate advisory information to another shovel 100 working at a riverbed downstream of the river.

Furthermore, part of the construction information 311 provided for the server 500 may be information useful in predicting changes in weather conditions not only at a worksite but also in a surrounding area. Specifically, for example, when the worksite is an area provided with no facilities for collecting information such as the look of the sky and a terrain shape, the image data obtained by the shovel 100 can be valuable information indicating the condition of this area.

Therefore, the management apparatus 300 according to this embodiment may, for example, give some incentives to contractors who provide the construction information 311 for the server 500.

Specifically, for example, the management apparatus 300 may retain information indicating the presence or absence of agreement on providing the construction information 311 to the server 500 with respect to each contractor and provide contractors who agree to provide construction information 311 with such points as to make profits each time construction is performed using the shovel 100.

Different Embodiment

A different embodiment is described below with reference to the drawings. The different embodiment is different from the embodiment in that the content of work of the shovel 100 is included in addition to the type of a location including a worksite and weather information in identifying advisory information. In the following description, differences between the embodiment and the different embodiment are described, and the same functional configurations as those of the embodiment are given the same reference numerals as the reference numerals used in the description of the embodiment and a description thereof is omitted.

Figure 8:
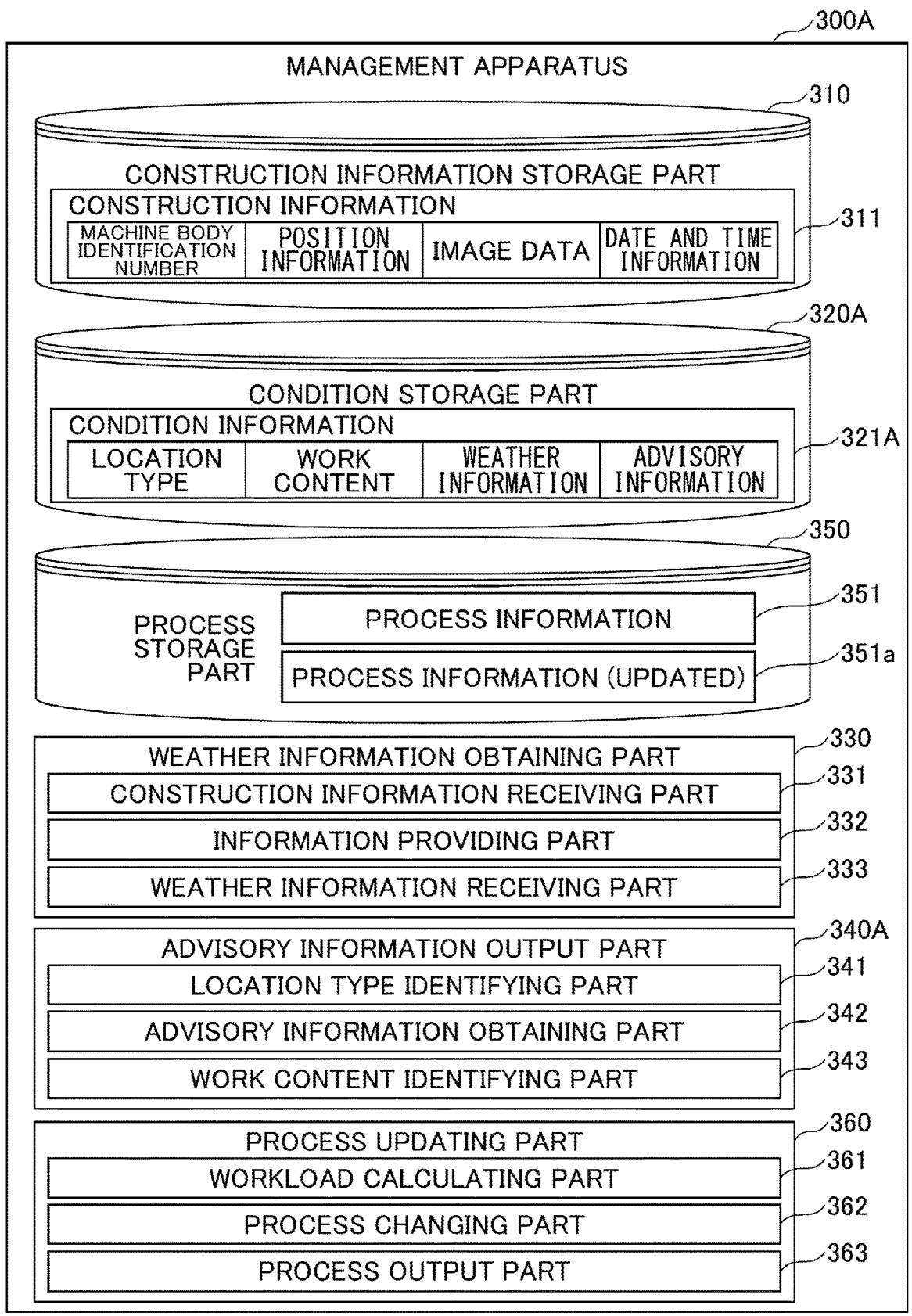
FIG. 8 is a diagram illustrating a functional configuration of a management apparatus according to a different embodiment.

FIG. 8 is a diagram illustrating a functional configuration of a management apparatus according to the different embodiment. A management apparatus 300A according to the different embodiment includes the construction information storage part 310, a condition storage part 320A, the weather information obtaining part 330, an advisory information output part 340A, a process storage part 350, and a process updating part 360.

The condition storage part 320A stores condition information 321A. The condition information 321A includes the type of a location, the content of work, weather information, and advisory information as information items, which are correlated.

According to the condition information 321A, examples of work contents include excavation, backfilling, demolition, leveling, and carrying out. The work content may be that indicating the content of work performed by a construction machine.

The work content according to this embodiment includes the content of work included in below-described process information and the content of work identified by analyzing the construction information 311.

That is, according to this embodiment, the work content includes the content of work to be performed in the future and the content of work performed in the past.

According to the condition information 321A of this embodiment, for example, advisory information in the case where the work content shows the content of work in the past and advisory information in the case where the work content shows the content of work to be performed in the future may be separately provided.

Specifically, for example, according to the condition information 321A, when the work content is "excavation" in the case where the location type is "residential area" and the weather information is that "the air dries," the advisory information may differ according to whether this "excavation" is the content of work in the past or the content of work to be performed in the future.

Furthermore, according to the condition information 321A of this embodiment, the advisory information may be correlated with not only weather information indicating the result of the prediction of future changes in weather conditions but also the history of past weather conditions.

More specifically, according to the condition information 321A of this embodiment, the location type, the information indicating past weather conditions, and the advisory information may be correlated with each other with respect to the content of work performed in the past.

Furthermore, according to the condition information 321A of this embodiment, the location type, the weather information, and the advisory information may be correlated with each other with respect to the content of work to be performed in the future.

The management apparatus 300A according to this embodiment may obtain information indicating past weather conditions from the server 500, for example. In this case, the server 500 may provide the management apparatus 300A with the history of past weather information of an area indicated by the position information of the shovel 100 along with the weather information according to the position information of the shovel 100 provided from the management apparatus 300A.

Furthermore, the information indicating the history of past weather conditions may be, for example, information identified from the data of an image captured by the space recognition device 80 of the shovel 100. In this case, the construction information 311 includes information indicating the history of weather conditions of an area surrounding the shovel 100 at the time of collection of the construction information 311. According to this embodiment, this information indicating weather conditions included in the construction information 311 may be referred to as the history of past weather conditions.

Specifically, for example, according to the condition information 321A, when the location type is "residential area" and the weather information is that "the air dries," each of the advisory information in the case where the past weather condition is also that "the air dries" and the advisory information in the case where the past weather condition is "rain" or the like may be correlated.

The advisory information output part 340A according to this embodiment includes the location type identifying part 341, the advisory information obtaining part 342, and a work content identifying part 343.

The work content identifying part 343 identifies the content of work of the shovel 100.

Specifically, the work content identifying part 343 refers to the process storage part 350 to identify the content of work to be performed in the future at the worksite of the shovel 100, based on the position information and the date and time information included in the construction information 311. Furthermore, the work content identifying part 343 analyzes the construction information 311 to identify the content of work performed in the past.

The process storage part 350 according to this embodiment stores process information 351 and process information 351*a*. The process information 351 may be, for example, input to the terminal device 400 by a supervisor or the like at a worksite and transmitted from the terminal device 400 to the management apparatus 300. The process information 351*a* is the process information 351 updated by the process updating part 360. The process information 351 and the process information 351*a* are described in detail below.

The process updating part 360 according to this embodiment updates the process information 351 stored in the process storage part 350 based on the weather information obtained by the weather information obtaining part 330.

The process updating part 360 according to this embodiment includes a workload calculating part 361, a process changing part 362, and a process output part 363.

The workload calculating part 361 calculates the workload of past work performed by the shovel 100 based on the construction information 311. Specifically, the workload calculating part 361 calculates a workload per predetermined time based on detection information included in the construction information 311. The workload per predetermined time may be, for example, a daily workload or the like.

Furthermore, the workload may be calculated for each shovel 100. Furthermore, in the case where multiple shovels 100 are performing work, the workload may be calculated for each shovel 100 or may be calculated as the total of the workloads of the shovels 100.

According to this embodiment, the workload is, for example, an estimated amount of soil that is the estimated value of the volume or weight of earth as an excavated object. The unit of the workload may be either displayed or not displayed. A displayed unit of volume, which is, for example, [m$^3$] (cubic meter), may also be other units such as [L] (litter). Likewise, a displayed unit of weight, which is, for example, [t] (ton), may also be other units such as [kg] (kilogram). The same applies to the unit of fuel consumption, etc. This configuration enables the shovel 100 to more easily present how the shovel 100 has been used to a related party such as the operator or a supervisor.

The process changing part 362 changes a work process shown by the process information 351 based on the weather information obtained by the weather information obtaining part 330.

Specifically, the process changing part 362, for example, calculates a workload to be performed during a work period specified in the process information 351 based on a workload per predetermined time calculated by the workload calculating part 361 and a work period shown in the process information 351. Then, the process changing part 362 changes the content of work, the work period, etc., shown in the process information 351 so that work of the workload to be performed during the work period is to be performed.

In other words, the process changing part 362 creates the process information 351a in which the content of work, a work period, etc., are changed according to the weather information, and stores the process information 351a in the process storage part 350.

The process changing part 362 according to this embodiment may be implemented by, for example, artificial intelligence or the like. In this case, in response to receiving the process information 351 and the weather information as inputs, the process changing part 362 creates new process information 351a from the relationship between the process information 351 and the weather information, and outputs the process information 351a.

In the case of implementing the process changing part 362 with artificial intelligence, the process changing part 362 may be provided in an external apparatus with artificial intelligence, for example.

The process output part 363 outputs the process information 351a to the display device 40 of the shovel 100, the terminal device 400, etc.

Figures 9, 10:
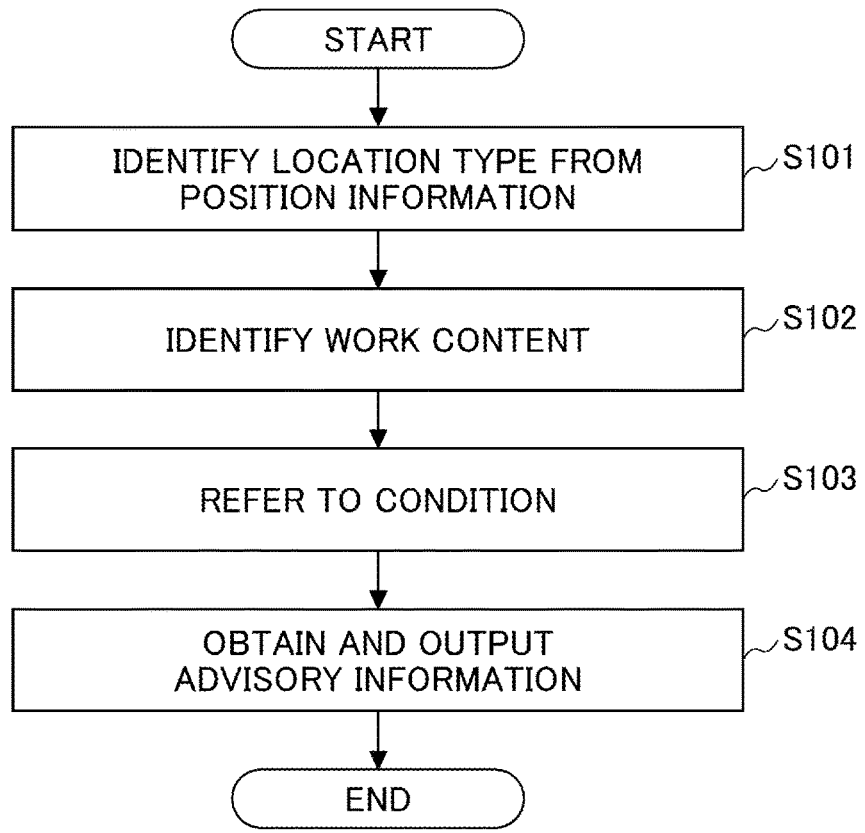
FIG. 9 is a diagram illustrating an example of process information.
FIG. 10 is a flowchart illustrating processing of an advisory information output part according to the different embodiment.

Next, the process information 351 stored in the process storage part 350 is described with reference to FIG. 9. FIG. 9 is a diagram illustrating an example of process information.

The process information 351 according to this embodiment includes a worksite, a work period, and a work content as information items. The process information 351 may include items other than the items illustrated in FIG. 9.

The value of the item "worksite" is information that identifies an area to be the worksite of the shovel 100. Specifically, the value of the item "worksite" is the address or the like of an area to be the worksite.

The value of the item "work period" indicates a period during which work is to be performed at the worksite. The value of the item "work content" indicates the content of work to be performed at the worksite during a corresponding work period.

The process information 351 of FIG. 9 indicates that excavation work is performed from 2/12 to 2/19 at a worksite at Δ town, χ city, ○ prefecture.

Next, processing of the advisory information output part 340A is described with reference to FIG. 10. FIG. 10 is a flowchart illustrating processing of an advisory information output part according to the different embodiment.

The process of step S101 of FIG. 10 is the same as the process of step S601 of FIG. 6. Accordingly, a description thereof is omitted.

In response to identifying the type of a location including the position information of the shovel 100 at step S101, the advisory information output part 340A uses the work content identifying part 343 to identify the work content of the shovel 100 (step S102).

Specifically, the work content identifying part 343 may analyze the construction information 311 received from the shovel 100 to identify the work content of the shovel 100 in the past. Furthermore, the work content identifying part 343 according to this embodiment determines whether the process information 351 whose worksite matches the area indicated by the position information of the shovel 100 and whose date and time information is included in the work period is stored in the process storage part 350. If the appropriate process information 351 is stored in the process storage part 350, the work content identifying part 343 refers to this process information 351 to identify the work content.

Thus, according to this embodiment, both of the work content of work performed in the past by the shovel 100 and the content of work to be performed by the shovel 100 in the future may be identified.

Next, the advisory information output part 340A uses the advisory information obtaining part 342 to refer to the condition information 321A to identify condition information that matches the combination of the identified location type, the obtained weather information, and the identified work content (step S103).

Next, the advisory information output part 340A obtains advisory information included in the specified condition information from the condition storage part 320A to output the advisory information to the shovel 100 (step S104).

Next, examples of outputting advisory information are described below with reference to FIGS. 11 and 12.

Figure 11:
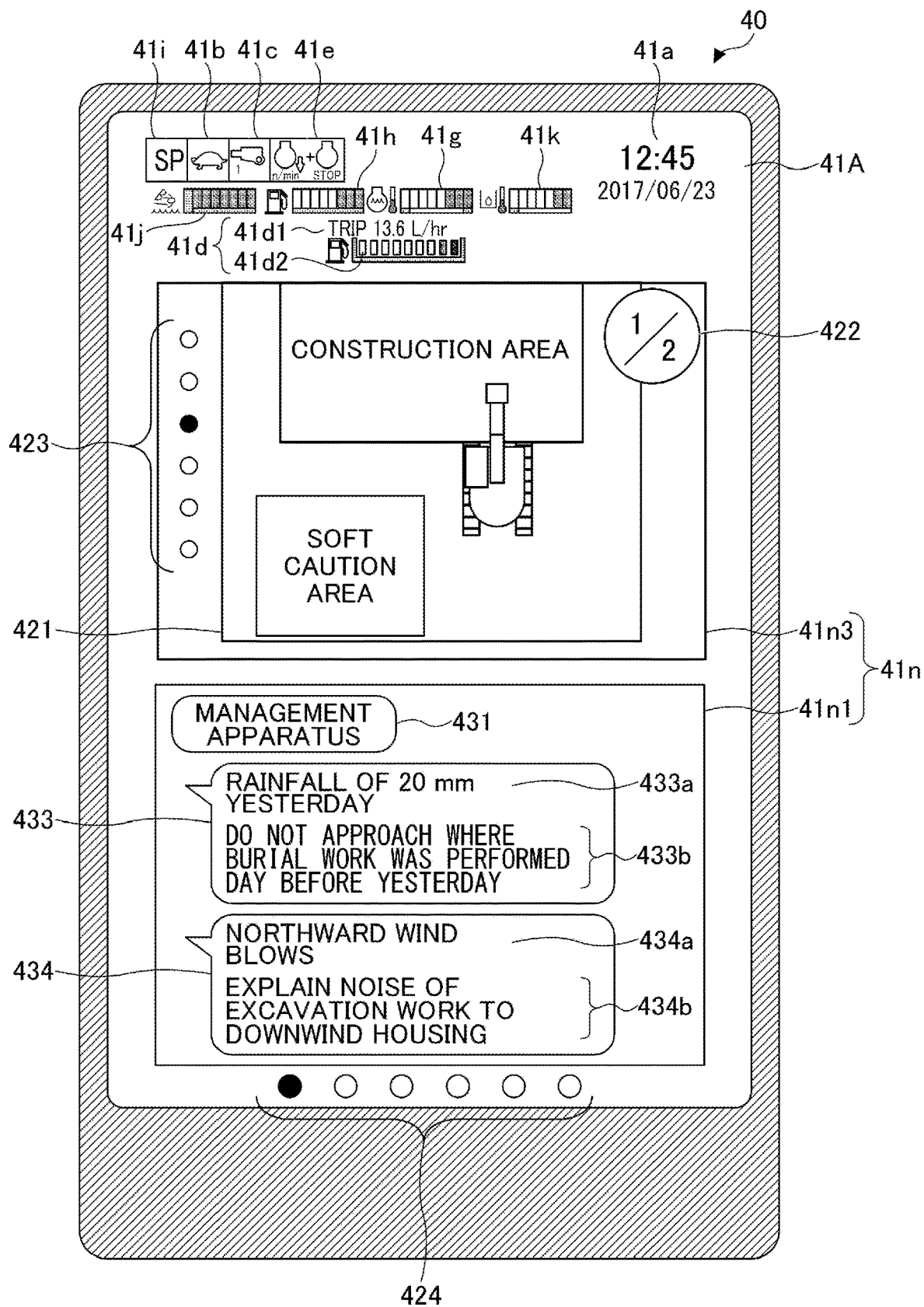
FIG. 11 is a first diagram illustrating an example of displaying advisory information according to the different embodiment.

FIG. 11 is a first diagram illustrating an example of displaying advisory information according to the different embodiment. A screen 41A illustrated in FIG. 11 is an example of a screen displayed on the display device 40.

The screen 41A of FIG. 11 illustrates an example in the case where the type of a location of an area including the position information of the shovel 100 is identified as a residential area, the content of work performed in the past is identified as "burial work," and the work to be performed in the future is identified as "excavation work."

In the text display area 41n1 of the screen 41A, the text information 431, text information 433, and text information 434 are displayed.

The text information 433 is information based on the content of work performed in the past. The text information 433 includes information 433a showing the history of weather conditions and advisory information 433b.

The information 433a showing the history of weather conditions shows the history of weather conditions at a worksite during a period from the performance of "burial work" performed in the past to the start of the shovel 100, and is displayed as RAINFALL OF 20 mm YESTERDAY according to the example of FIG. 11.

The advisory information 433b is advisory information correlated with the combination of the past work content "excavation work" and the information showing the history of weather conditions "a rainfall of 20 mm yesterday" in the condition information 321A. According to the example of FIG. 11, DO NOT APPROACH WHERE BURIAL WORK WAS PERFORMED DAY BEFORE YESTERDAY is displayed as the advisory information 433b.

The text information 434 is information based on the content of work to be performed in the future. The text information 434 includes weather information 434a and advisory information 434b.

The weather information 434a shows the result of the prediction of future changes in weather conditions at a worksite, and is displayed as NORTHWARD WIND BLOWS according to the example of FIG. 11.

The advisory information 434b is advisory information correlated with the combination of the content of work to be performed in the future "excavation work" and the weather information "the northward wind blows" in the condition information 321A. According to the example of FIG. 11, EXPLAIN NOISE OF EXCAVATION WORK TO DOWNWIND HOUSING is displayed as the advisory information 434b.

Figure 12:
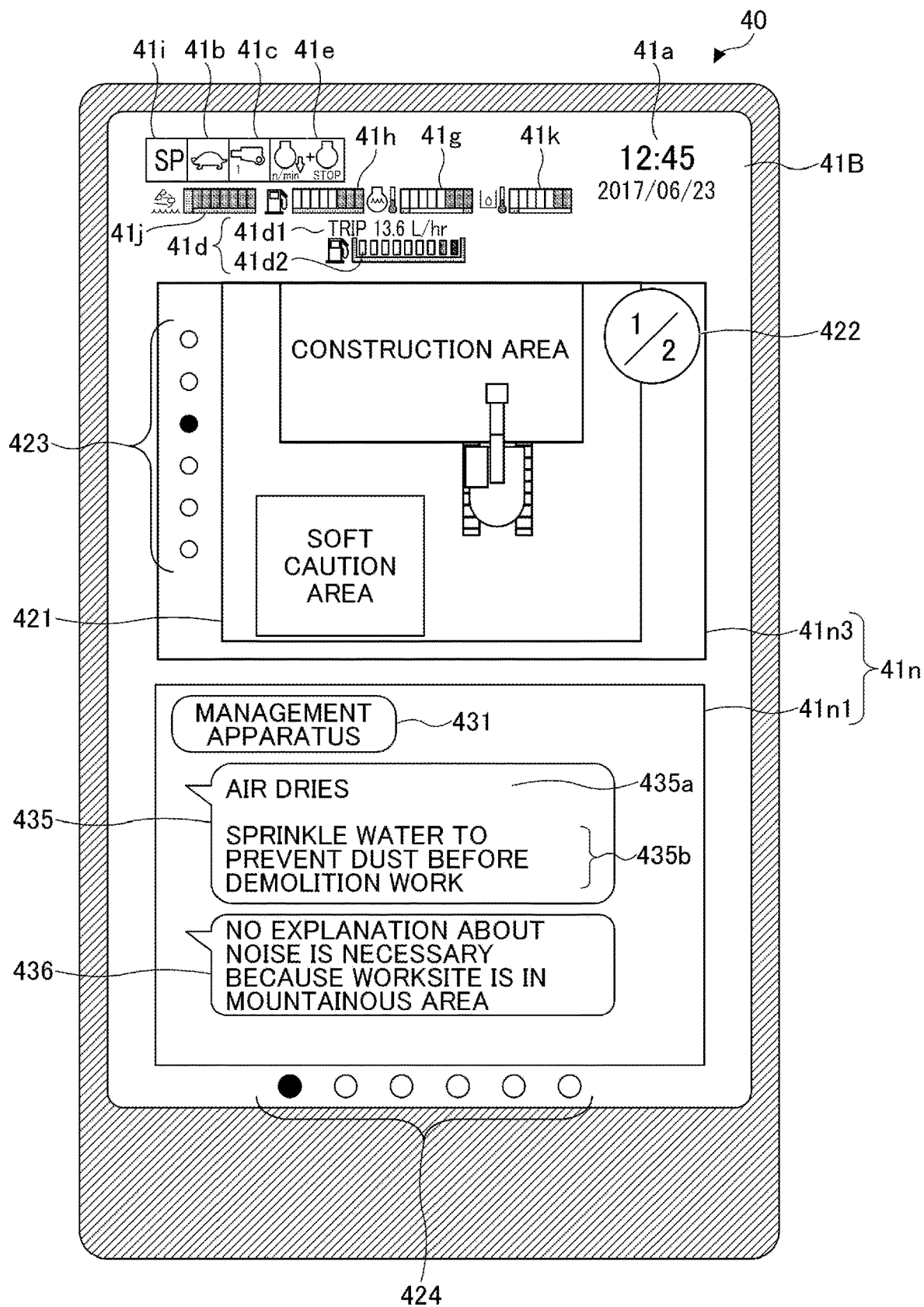
FIG. 12 is a second diagram illustrating an example of displaying advisory information according to the different embodiment.

FIG. 12 is a second diagram illustrating an example of displaying advisory information according to the different embodiment. A screen 41B illustrated in FIG. 12 is an example of a screen displayed on the display device 40.

The screen 41B of FIG. 12 illustrates an example in the case where the type of a location of an area including the position information of the shovel 100 is identified as a mountainous area and the work to be performed in the future is identified as "demolition work."

In the text display area 41n1 of the screen 41B, the text information 431, text information 435, and text information 436 are displayed.

The text information 435 includes weather information 435a and advisory information 435b.

The weather information 435a shows the result of the prediction of future changes in weather conditions at a worksite, and is displayed as AIR DRIES according to the example of FIG. 12.

The advisory information 435b is advisory information correlated with the combination of the content of work to be performed in the future "demolition work" and the weather information "the air dries" in the condition information 321A. According to the example of FIG. 12, SPRINKLE WATER TO PREVENT DUST BEFORE DEMOLITION WORK is displayed as the advisory information 435b.

The text information 436 may be displayed when the worksite is a mountainous area or the like, for example. The text information 436 may be, for example, advisory information correlated with the content of work to be later performed "demolition work" and the location type "a mountainous area" in the condition information 321A.

Thus, according to the condition information 321A of this embodiment, for example, information showing whether there is something that a contractor should explain to the neighboring areas of a worksite may be correlated with the location type as advisory information.

Thus, according to this embodiment, advisory information based on the location type of a worksite, weather information, and the content of work is presented to a contractor. Thus, according to this embodiment, it is possible to present appropriate advisory information according to the content of work.

Next, an example of displaying the process information 351a is described with reference to FIG. 13. FIG. 13 is a diagram illustrating an example of displaying updated process information.

FIG. 13 illustrates the case where the process information 351 is updated based on the weather information received from the server 500 on February 11, which is the day before the starting date of the work period shown in the construction information 351, namely, February 12 (see FIG. 9).

A screen 41C illustrated in FIG. 13 is an example of a screen displayed on the display device 40 of the shovel 100. The screen 41C includes a display area 437 and a display area 438.

In the display area 437, text information 437a and text information 437b are displayed. Specifically, the text information 437a is a message indicating that the weather condition indicated by the weather information of February 15 is rainy. Furthermore, the text information 437b indicates the details of an update on the process information 351. Specifically, the text information 437b is a message indicating that the content of work on February 15 has been updated from "excavation work" to "maintenance work."

In the display area 438, text information 438a and information 438b including the process information 351a are displayed. The information 438b is displayed using a text image, an icon image, a numerical value image, etc. Of the weather information, weather is displayed using an icon image.

The text information 438a is a message indicating that the information 438b is the process information 351a, which is the process information 351 in which the content of work on February 15 is changed to "maintenance work."

The information 438b includes the process information 351a, weather conditions based on weather information, the content of daily work, a daily workload, etc., during the work period shown by the process information 351a. The process information 351a is updated information including a worksite, a work period, and a work content.

In the information 438b, information other than the process information 351a may be calculated by the process changing part 362, for example.

Thus, according to this embodiment, the process information 351 showing a work process may be updated according to weather information. That is, according to this embodiment, it is possible to update the process information 351 based on weather information obtained using part of the construction information 311 collected by the shovel 100.

Thus, according to this embodiment, it is possible to update a work process in accordance with the result of the prediction of changes in weather conditions at the worksite of the shovel 100 and to prevent the occurrence of work delay, postponement, etc., due to weather conditions.

Furthermore, the management apparatus 300A according to this embodiment may receive, for example, from the terminal device 400 or the like, an input of information indicating whether work of an intended workload has been successfully performed within a work period shown by the process information 351a in the case of having performed work according to the process information 351a.

In this case, the management apparatus 300A may provide the process changing part 362 with this information to cause the process changing part 362 to learn whether the process information 351 has been appropriately updated.

According to this embodiment, by thus inputting an evaluation of the process information 351a to the process changing part 362 to cause the process changing part 362 to perform learning, the process information 351a, updated according to weather information, can be made more appropriate.

Figure 14:
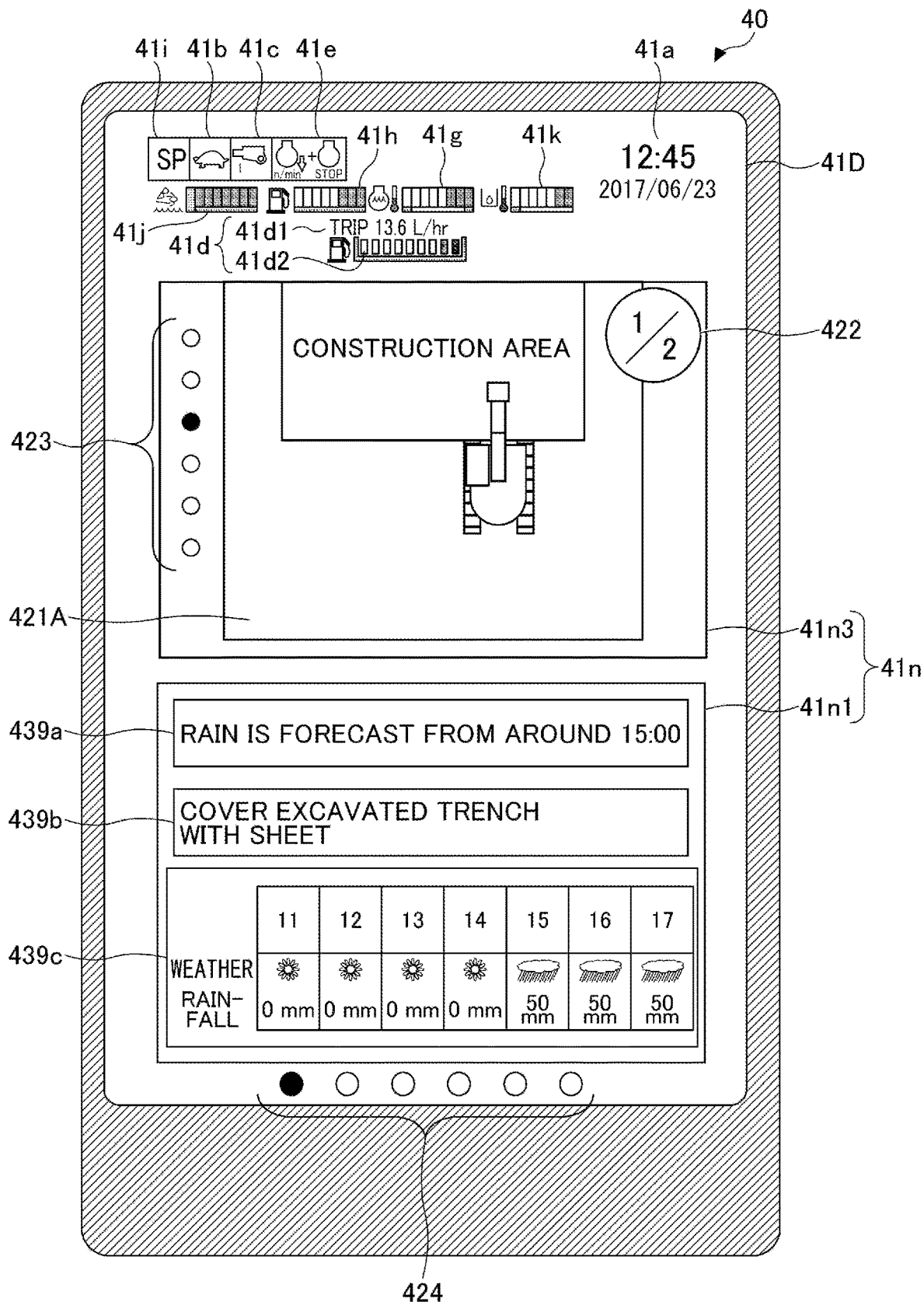
FIG. 14 is a third diagram illustrating an example of displaying advisory information according to the different embodiment.

Next, reference is made to FIG. 14, which is a third diagram illustrating an example of displaying advisory information according to the different embodiment. A screen 41D illustrated in FIG. 14 is an example of a screen displayed on the display device 40.

In the screen 41D of FIG. 14, hourly weather information at the worksite of the shovel 100 is displayed.

In the text display area 41n1 of the screen 41D, text information 439a, advisory information 439b, and weather information 439c are displayed. Of the weather information, weather is displayed using an icon image.

The text information 439a shows the result of the prediction of future changes in weather conditions at the worksite, and is displayed as RAIN IS FORECAST FROM AROUND 15:00 according to the example of FIG. 14.

The advisory information 439b may be advisory information correlated with the text information RAIN IS FORECAST FROM AROUND 15:00 and the content of work "excavation" in the condition information 321A. According to the example of FIG. 14, COVER EXCAVATED TRENCH WITH SHEET is displayed as the advisory information 439b.

The weather information 439c shows hourly weather information, showing weather and precipitation from 11:00 to 17:00. This weather information 439c shows that rain is forecast from around 15:00.

Thus, according to this embodiment, by causing hourly weather information to be displayed, it is possible to cause the operator of the shovel 100 to be aware of hourly weather changes.

It is often the case that the worksite of the shovel 100 is in a mountainous area so that it is necessary to travel on unpaved roads from the worksite to general roads. Therefore, it is useful to cause the operator to be aware of hourly weather information.

Furthermore, the advisory information 439b is changed according to hourly weather information. Specifically, for example, "approaching rain clouds," "watch out for snow," etc., may be displayed as the advisory information 439b.

Furthermore, according to this embodiment, wind-related information (wind speed, wind direction, etc.) may be displayed as weather information. In this case, the wind direction is displayed using an icon image, and the wind speed displayed using a numerical value image. Expensive measuring equipment is employed at a worksite where the shovel 100 operates. By causing wind-related information (wind speed, wind direction, etc.) as well to be displayed, a worker can store the measuring equipment before a strong wind blows. Therefore, it is possible to prevent damage to the measuring equipment due to a strong wind.

Furthermore, according to the above-described embodiments, the shovel 100 is described as an example of a construction machine. The construction machine, however, may be other than the shovel 100, and may be any construction machine as long as the construction machine can obtain its work pattern record information and environmental condition record information and transmit them to the management apparatus 300. Specifically, the embodiments may be applied to wheel loaders, bulldozers, etc.

Furthermore, the condition information showing the output condition of advisory information, referred to when the advisory information is obtained, which is created in advance and stored in the management apparatus 300 according to the above-described embodiments, is not limited to this. The output condition of advisory information may be learned by a learning part implemented by the processor 316 of the management apparatus 300.

Specifically, the learning part learns the relationship between information on a worksite and weather information and a situation to care about as the weather changes (the content of advisory information) according to a dataset created based on the combination of construction information, weather information, and advisory information (the output condition of advisory information). In other words, the learning part creates a model that outputs advisory information, using information on a worksite and weather information as an input.

Here, the advisory information included in the dataset is advisory information that has been output in response to the determination that the construction information and the weather information satisfy the output condition. The advisory information included in the dataset may be stored in the condition storage part 320A as the condition information 321A.

In this case, the management apparatus 300 may input the construction information received by the construction information receiving part 331 and the weather information received by the weather information receiving part 333 to the model and transmit the advisory information output from the model to a construction machine to have the advisory information output to the display device, the sound output device, the exterior alarm device, etc., of the construction machine.

Furthermore, each time advisory intonation is output, the learning part may update the mode using the output advisory information as judgment data. By thus updating the model, it is possible to output advisory information more suitable for a situation based on the construction information and the weather information.

Embodiments of the present invention are described in detail above. The present invention, however, is not limited to the above-described embodiments, and variations and substitutions may be made to the above-described embodiments without departing from the scope of the present invention.

What is claimed is:

1. An information communications system for a construction machine, comprising:
   a hardware processor configured to
      receive construction information from a contractor-side device;
      receive weather information from a weather server; and
      generate advisory information based on the construction information and the weather information, the advisory information including information indicating precautions for work and messages to an area surrounding a worksite of the construction machine,
   wherein the hardware processor is further configured to transmit the construction information to the weather server, and
   the weather information is a result of an analysis conducted by the weather server using the construction information.

2. The information communications system as claimed in claim 1, wherein
   the construction machine is a shovel, and
   the weather information is derived based on data of an image captured by an image capturing device of the shovel and on position information of the shovel.

3. The information communications system as claimed in claim 2, wherein the hardware processor is configured to cause the advisory information to be displayed on at least one of the shovel, a field management device, and an assist device.

4. The information communications system as claimed in claim 3, wherein the hardware processor is configured to cause the weather information to be displayed, along with the advisory information, on the at least one of the shovel, the field management device, and the assist device.

5. The information communications system as claimed in claim 2, wherein the hardware processor is configured to update process information showing a work process based on the weather information and to cause the updated process information to be displayed on at least one of the shovel, a field management device, and an assist device.

6. The information communications system as claimed in claim 1, further comprising:
a display device configured to display the advisory information.

7. The information communications system as claimed in claim 6, wherein the display device is configured to display an image of an area behind the construction machine along with the advisory information, the image being captured by an image capturing device of the construction machine.

8. The information communications system as claimed in claim 6, wherein the display device is configured to display an overhead view image along with the advisory information, the overhead view image being captured by an image capturing device of the construction machine.

9. The information communications system as claimed in claim 6, wherein the display device is configured to display the weather information, an update on the construction information of the construction machine based on the weather information, and the construction information subjected to the update.

10. The information communications system as claimed in claim 1, wherein the construction information includes information on records of environmental conditions during work of the construction machine, information showing a content of work of the construction machine, or machine body identification information for identifying the construction machine.

11. The information communications system as claimed in claim 1, wherein the weather information includes weather information obtained in a past, weather forecast information that predicts weather conditions, information showing a result of predicting changes in weather conditions at an area indicated by position information of the construction machine, or information predicting changes in weather conditions at a worksite different from the worksite of the construction machine that has transmitted the position information.

12. An information communications system for a construction machine, comprising:
a hardware processor configured to
receive construction information from a contractor-side device;
receive weather information from a weather server; and
generate advisory information based on the construction information and the weather information; and
a display device configured to display the advisory information,
wherein the display device is configured to display an image along with the advisory information, the image indicating a position of a caution area at a worksite identified based on the construction information, the caution area being estimated based on the construction information and the weather information.

13. A machine learning apparatus comprising:
a hardware processor configured to learn an output condition of advisory information according to a dataset, the dataset including a combination of information on a worksite where a construction machine is located, weather information, and the advisory information representing a situation to care about as weather at the worksite changes, the advisory information including information indicating precautions for work and messages to an area surrounding the worksite,
wherein the hardware processor is further configured to receive construction information from a contractor-side device and transmit the received construction information to a weather server, and
the weather information is a result of an analysis conducted by the weather server using the construction information.

14. The machine learning apparatus as claimed in claim 13, wherein the hardware processor is configured to output the advisory information in response to receiving an input of the information on the worksite and the weather information.

* * * * *